United States Patent
Sarkar

(10) Patent No.: US 11,206,339 B2
(45) Date of Patent: *Dec. 21, 2021

(54) SPECTATOR VIEW INTO AN INTERACTIVE GAMING WORLD SHOWCASED IN A LIVE EVENT HELD IN A REAL-WORLD VENUE

(71) Applicant: Sony Interactive Entertainment LLC, San Mateo, CA (US)

(72) Inventor: Bhaswar Sarkar, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/460,946

(22) Filed: Jul. 2, 2019

(65) Prior Publication Data

US 2019/0327392 A1 Oct. 24, 2019

Related U.S. Application Data

(63) Continuation of application No. 15/727,137, filed on Oct. 6, 2017, now Pat. No. 10,341,537.

(Continued)

(51) Int. Cl.
*H04N 5/222* (2006.01)
*H04N 21/81* (2011.01)
(Continued)

(52) U.S. Cl.
CPC ........... *H04N 5/2224* (2013.01); *A63F 13/27* (2014.09); *A63F 13/335* (2014.09); *A63F 13/65* (2014.09);
(Continued)

(58) Field of Classification Search
CPC ......... H04N 21/21805; H04N 21/2187; H04N 21/23; H04N 21/47; H04N 21/472;
(Continued)

(56) References Cited

U.S. PATENT DOCUMENTS

| 2015/0153571 A1* | 6/2015 | Ballard | H04W 76/10 |
| | | | 345/8 |
| 2016/0036962 A1* | 2/2016 | Rand | H04W 76/25 |
| | | | 455/418 |

(Continued)

FOREIGN PATENT DOCUMENTS

| WO | WO 2009109784 A1 | 9/2009 |
| WO | WO 2018073584 A1 | 4/2018 |

*Primary Examiner* — Nicholas T Corbo
(74) *Attorney, Agent, or Firm* — Penilla IP, APC

(57) ABSTRACT

A method including establishing a multi-player gaming session of a gaming application that generates an interactive gaming world, the live event being a real-world venue where players playing the gaming application are present. A 3D live view of the venue is generated based on captured video streams, and generated for a physical POV anchored to a physical location in the venue. The 3D live view is streamed to an HMD of a remote user located outside the venue, and presents an augmented reality view of the live event. A request is received from the remote user to jump into the gaming session as a spectator of the interactive gaming world from a virtual POV defined by a virtual location in the gaming world. The spectator view is delivered to the HMD of the remote user for display, the spectator view presenting a virtual reality view of the interactive gaming world.

18 Claims, 22 Drawing Sheets

Related U.S. Application Data

(60) Provisional application No. 62/566,203, filed on Sep. 29, 2017.

(51) Int. Cl.

| | | |
|---|---|---|
| *H04N 21/2187* | (2011.01) | |
| *H04N 21/472* | (2011.01) | |
| *H04N 21/218* | (2011.01) | |
| *H04N 13/383* | (2018.01) | |
| *H04N 13/279* | (2018.01) | |
| *A63F 13/65* | (2014.01) | |
| *A63F 13/335* | (2014.01) | |
| *H04N 13/344* | (2018.01) | |
| *A63F 13/86* | (2014.01) | |
| *A63F 13/27* | (2014.01) | |
| *H04N 13/282* | (2018.01) | |
| *H04N 5/272* | (2006.01) | |
| *H04N 21/23* | (2011.01) | |
| *H04N 21/47* | (2011.01) | |
| *H04N 13/117* | (2018.01) | |

(52) U.S. Cl.
CPC .............. *A63F 13/86* (2014.09); *H04N 5/272* (2013.01); *H04N 13/279* (2018.05); *H04N 13/282* (2018.05); *H04N 13/344* (2018.05); *H04N 13/383* (2018.05); *H04N 21/2187* (2013.01); *H04N 21/21805* (2013.01); *H04N 21/23* (2013.01); *H04N 21/47* (2013.01); *H04N 21/472* (2013.01); *H04N 21/816* (2013.01); *H04N 13/117* (2018.05)

(58) Field of Classification Search
CPC .... H04N 21/816; H04N 5/2224; H04N 5/272; H04N 13/282; A63F 13/27; A63F 13/335; A63F 13/65; A63F 13/86
See application file for complete search history.

(56) References Cited

U.S. PATENT DOCUMENTS

| | | | | |
|---|---|---|---|---|
| 2016/0300387 | A1* | 10/2016 | Ziman | H04N 7/157 |
| 2017/0157512 | A1* | 6/2017 | Long | A63F 13/497 |
| 2017/0228922 | A1* | 8/2017 | Kaeser | G06F 3/04815 |
| 2017/0264936 | A1* | 9/2017 | Depies | H04N 21/4126 |

* cited by examiner

SPECTATOR VIEW INTO AN INTERACTIVE GAMING WORLD SHOWCASED IN A LIVE EVENT HELD IN A REAL-WORLD VENUE

CLAIM OF PRIORITY

The present application is a continuation of and claims priority to and the benefit of Ser. No. 15/727,137, filed on Oct. 6, 2017, entitled "SPECTATOR VIEW INTO AN INTERACTIVE GAMING WORLD SHOWCASED IN A LIVE EVENT HELD IN A REAL-WORLD VENUE"; which claims priority to and the benefit of the commonly owned, provisional patent application, U.S. Ser. No. 62/566,203, filed on Sep. 29, 2017, entitled "SPECTATOR VIEW INTO AN INTERACTIVE GAMING WORLD SHOWCASED IN A LIVE EVENT HELD IN A REAL-WORLD VENUE," all of which are herein incorporated by reference in their entireties.

TECHNICAL FIELD

The present disclosure is related to electronic sports (eSports) and its supporting technologies.

BACKGROUND OF THE DISCLOSURE

Video games and their related industries (e.g., video gaming) represent a large percentage of the worldwide entertainment market, with some projections having video game global revenues exceeding revenue from the movie industry in the near future. The kids growing up playing video games are now adults (young and old) influencing where their entertainment moneys are to be spent—in the world of video game entertainment.

Video games are played anywhere and at any time using various types of platforms, including gaming consoles, desktop computers, laptop computers, mobile phones, etc. Once a niche market directed to a small number of children and young adults, video games have become increasingly popular across generations, and over time has become an important part of popular culture.

A new dawn of video games is emerging in the form of eSports, otherwise known and described by competitive video gaming or professional video gaming In the world of eSports, professional gamers gather in an arena to play a video game, typically in a multiplayer online game (MOG) format that is supported through a local area network or internet. Individuals or teams of individuals battle it out live in the eSports arena in front of a live audience, where a broadcasting team injects energy and excitement while giving play-by-play of the action within the MOG. A video production team is working frantically backstage projecting views into the gaming environment of the MOG onto arena sized video display panels so that the audience is able to watch the action within the MOG, as viewed and experienced by the professional video gamers. Also, live cameras that are focused on the audience or the professional gamers may project onto the arena video display panels, as directed by the video production team, to further excite the audience. The live audience participates in a live event, not unlike those attending a traditional professional sporting event (e.g., basketball, baseball, football, boxing, mixed-martial arts, etc.).

In addition, the views presented on the video display panels as generated by the video production team may be live streamed to a wider audience over any network, such as broadcast, internet, mobile, etc. While the live audience may number in the thousands (30+ thousand), the streaming audience can number in the millions (e.g., 30+ million). For a video game having over 90 million casual gamers, a world championship featuring that video game will attract millions of streaming viewers, both in the live format as well as post event viewing. To give a sense of the popularity of an eSports event, a world championship held in 2016 drew a live audience of approximately forty thousand, and a live streaming audience of over twenty-five million. The game play of the professional gamers continued to be viewed even after the live event was completed.

Various technologies supporting eSports are being developed to give the live and remote audience the best viewing experience.

It is in this context that embodiments of the disclosure arise.

SUMMARY

Embodiments of the present disclosure relate to systems and methods for providing one or more spectator views into a gaming world in association with one or more game plays of one or more users playing a gaming application. Several inventive embodiments of the present disclosure are described below.

In one embodiment, a method for enabling participation in a live event is described. The method includes establishing a multi-player gaming session controlled by a plurality of players through execution of a gaming application at a server, the multi-player gaming session generating an interactive gaming world within which player participation is enabled, the live event being a real-world venue where the plurality of players is present. The method includes generating at the server a three dimensional (3D) live view of the real-world venue based on one or more captured video streams, the 3D live view generated for a physical point-of-view (POV) of the live event, wherein the physical POV is anchored to a physical location in the real-world venue. The method includes streaming the 3D live view via a network from the server to an HMD of a first remote user, the first remote user being located outside of the real-world venue, the 3D live view presenting an augmented reality view of the live event to the first remote user through a head mounted display (HMD). The method includes receiving at the server a request from the first remote user to jump into the gaming session as a spectator of the interactive gaming world from a first virtual POV defined by a virtual location in the interactive gaming world. The method includes generating by the server a first spectator view associated with the first virtual POV. The method includes delivering the first spectator view via the network to the HMD of the first remote user for display, the first spectator view presenting a virtual reality view of the interactive gaming world to the first remote user through the HMD.

In another embodiment, a non-transitory computer-readable medium storing a computer program for enabling participation in a live event is described. The computer-readable medium includes program instructions for establishing a multi-player gaming session controlled by a plurality of players through execution of a gaming application at a server, the multi-player gaming session generating an interactive gaming world within which player participation is enabled, the live event being a real-world venue where the plurality of players is present. The computer-readable medium includes program instructions for generating at the server a three dimensional (3D) live view of the real-world venue based on one or more captured video streams, the 3D live view generated for a physical point-of-view (POV) of the live event, wherein the physical POV is anchored to a physical location in the real-world venue. The computer-readable medium includes program instructions for streaming the 3D live view via a network from the server to an HMD of a first remote user, the first remote user being located outside of the real-world venue, the 3D live view presenting an augmented reality view of the live event to the first remote user through a head mounted display (HMD). The computer-readable medium includes program instructions for receiving at the server a request from the first remote user to jump into the gaming session as a spectator of the interactive gaming world from a first virtual POV defined by a virtual location in the interactive gaming world. The computer-readable medium includes program instructions for generating by the server a first spectator view associated with the first virtual POV. The computer-readable medium includes program instructions for delivering the first spectator view via the network to the HMD of the first remote user for display, the first spectator view presenting a virtual reality view of the interactive gaming world to the first remote user through the HMD.

In still another embodiment, a computer system is described, and includes a processor, and memory coupled to the processor and having stored therein instructions that, if executed by the computer system, cause the computer system to execute a method for enabling participation in a live event. The method includes establishing a multi-player gaming session controlled by a plurality of players through execution of a gaming application at a server, the multi-player gaming session generating an interactive gaming world within which player participation is enabled, the live event being a real-world venue where the plurality of players is present. The method includes generating at the server a three dimensional (3D) live view of the real-world venue based on one or more captured video streams, the 3D live view generated for a physical point-of-view (POV) of the live event, wherein the physical POV is anchored to a physical location in the real-world venue. The method includes streaming the 3D live view via a network from the server to an HMD of a first remote user, the first remote user being located outside of the real-world venue, the 3D live view presenting an augmented reality view of the live event to the first remote user through a head mounted display (HMD). The method includes receiving at the server a request from the first remote user to jump into the gaming session as a spectator of the interactive gaming world from a first virtual POV defined by a virtual location in the interactive gaming world. The method includes generating by the server a first spectator view associated with the first virtual POV. The method includes delivering the first spectator view via the network to the HMD of the first remote user for display, the first spectator view presenting a virtual reality view of the interactive gaming world to the first remote user through the HMD.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
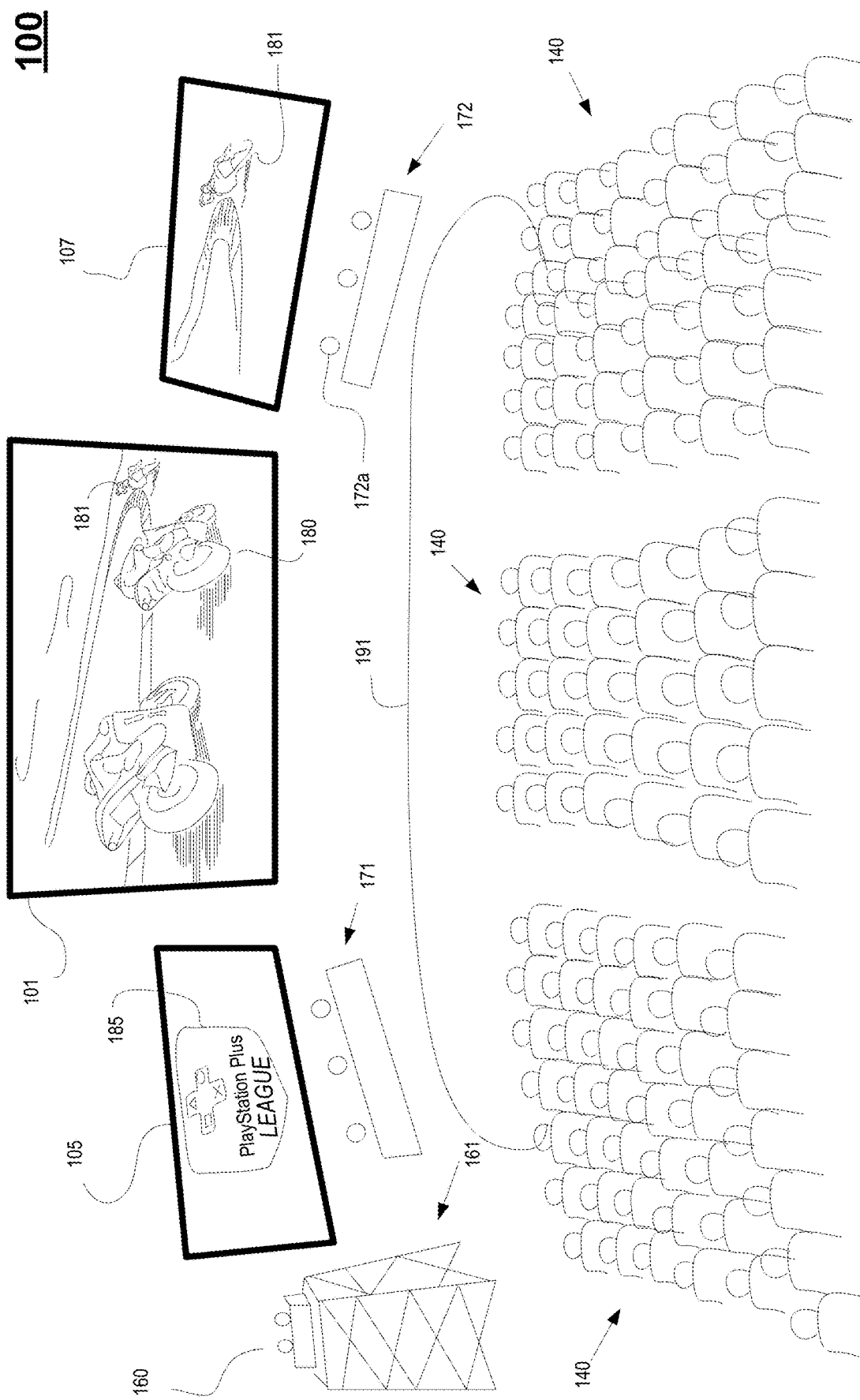
FIG. 1A illustrates an electronic sports (eSports) arena showcasing a live video gaming competition, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems for participating in a live event (e.g., live eSports event including competitive video gaming) by a remote user as a virtual audience member, in accordance with embodiments of the present disclosure. Various technologies are described giving the remote user a fully immersive experience within the real-world venue (e.g., eSports arena), including presenting a live view of the eSports event that is virtually generated for a POV taken from a selected seat in the real-world venue. In a preview mode, a remote user is able to preview the POV from one or more selected seats in the eSports arena, wherein the preview includes a live view of the eSports event, or a generic view of a previous event held in the eSports arena. An augmented reality view of the eSports event may be presented, wherein the augmented view is virtually generated for a POV taken from a selected seat in the real-world venue, and includes the live view of the eSports event that is augmented with digital data (e.g., inserting a digitized representation of a friend of the user as another virtual audience member).

In addition, a remote user participating in a live eSports event as a virtual audience member may access one or more jump-in views of a gaming world of the event. For example, the eSports event may include a video gaming competition between multiple professional gamers arranged individually or by teams, wherein the gamers are simultaneously playing a video game against each other. The remote user may be viewing the live event as an audience member, wherein a virtualized POV is generated for the remote user based on which seat in the real-world venue was selected by the audience member. For a fully immersive view, the remote user may be presented with a spectator view or jump-in view within the gaming world of the video game that is being played by the professional gamers in the eSports live event. That is, rather than viewing a live view and/or augmented reality view of the eSports event, the remote user may jump into the gaming world at any location to view the action. This jump-in view need not necessarily be generated from the POV of one of the professional gamers, and can include POVs that are generated from locations selectable by the remote user, such as a birds eye view, a side view generated from the side of a character being played by one of the professional gamers, etc. In this manner, the remote user may select a view that provides a close-up to the action that may be in the center of the action between two or more professional gamers.

With the above general understanding of the various embodiments, example details of the embodiments will now be described with reference to the various drawings. For purposes of clarity and brevity, embodiments of the present invention are described in relation to the various technologies supporting an immersive experience of a remote user virtually participating in a live eSports video gaming event; however, it is understood that VR content may be generated for any type of event, including real events and/or virtual events.

FIG. 1A illustrates an electronic sports (eSports) arena 100, as an example of a real-world venue, showcasing a live eSports event, such as a video gaming competition, in accordance with one embodiment of the present disclosure. The live eSports event may be based on a video game that is being simultaneously played by a plurality of professional gamers in competition with each other. As previously described, the live eSports event may be produced to include the professional gamers each playing a video game within a gaming world, one or more broadcasters or announcers that follow and promote the action within the gaming world to the audience members (e.g., live participants, remote participants, and/or virtual participants), and live audience members.

For example, the eSports arena 100 includes arena seating 140, wherein live audience members may be seated within arena seating 140, and participate in the live event as members of a live audience. As shown in FIG. 1A, the arena seating 140 is filled with live audience members. As will be further described, remote users may also participate in the live event as a virtual audience member that is seated within arena seating 140.

The arena seating 140 faces the front 191 of a stage 190. The stage includes a first podium including a first team 171 of professional gamers. The stage also includes a second podium including a second team 172 of professional gamers. As shown, each team includes three team members. The team members are each simultaneously playing a multi-player video game (e.g., MOB). For purposes of illustration only, the video game is a motorcycle racing game, wherein each professional gamer is a motorcycle racer racing through a course within the video game. Team members may assist each other in achieving an overall winning result. For example, the team with the best overall finishing results wins the event.

One or more arena sized displays and/or monitors are present on or about the stage 190. The content shown on the displays are produced by a behind the scenes video production team that directs the presentation of the live eSports event both within the eSports arena, and to the streaming audience. For example, a main display 101 shows a view of the gaming world that may be of particular interest at that moment in time. For illustration, main display 101 may show the leaders of the motorcycle race from a viewpoint of a character of one of the professional gamers. In particular, three racers are just ahead of the racer whose viewpoint is shown in main display 101. In another implementation, main display 101 is showing a view into the gaming world that may not align with any of the characters of the professional gamers, but instead provides an optimum view into the action between the professional gamers within the gaming world.

As shown, side display 107 is located directly above the second team 172, and may present a view that is associated with the game play of one of the gamers on the second team 172. For example, motorcycle racer 180 may be a character being controlled by professional gamer 172a of the second team 172, and the viewpoint of motorcycle racer 180 is being shown in side display 107. In particular, the viewpoint of motorcycle racer 180 includes a view of other riders ahead of racer 180 on the course, including the back of motorcycle racer 181, wherein racer 181 is ahead of motorcycle racer 180 on the racecourse. Racer 181 may be controlled by one of the available professional gamers on either the first team 171 or the second team 172.

Side display 105 is located directly above the first team 171, and may present a view that is associated with the game play of one of the gamers on the first team 171. In addition, the images presented on either side display 105 and 107 may provide additional content rather than being limited to game play of one of the professional gamers. For example, side display 105 includes an image of a symbol 185 that represents and eSports league supported by SONY PlayStation (e.g., PlayStation Plus League). For illustration, the video game generating the motorcycle racing game play of the professional gamers on the first team 171 and the second team 172 is promoted by the eSports league.

The stage also includes a tower 161 that elevates one or more broadcasters 160 that provide live announcing and entertainment throughout the event. The broadcasters 160 fulfill a vital role in promoting the live event within the eSports arena as well as to the streaming audience, and virtual audience. For example, as an exciting moment occurs within the game play of one of the professional gamers, the announcers may highlight that game play through their announcing as it is being presented on the main display 101. The audience members typically react favorably to the announcing by the broadcasters 160.

Figure 1B:
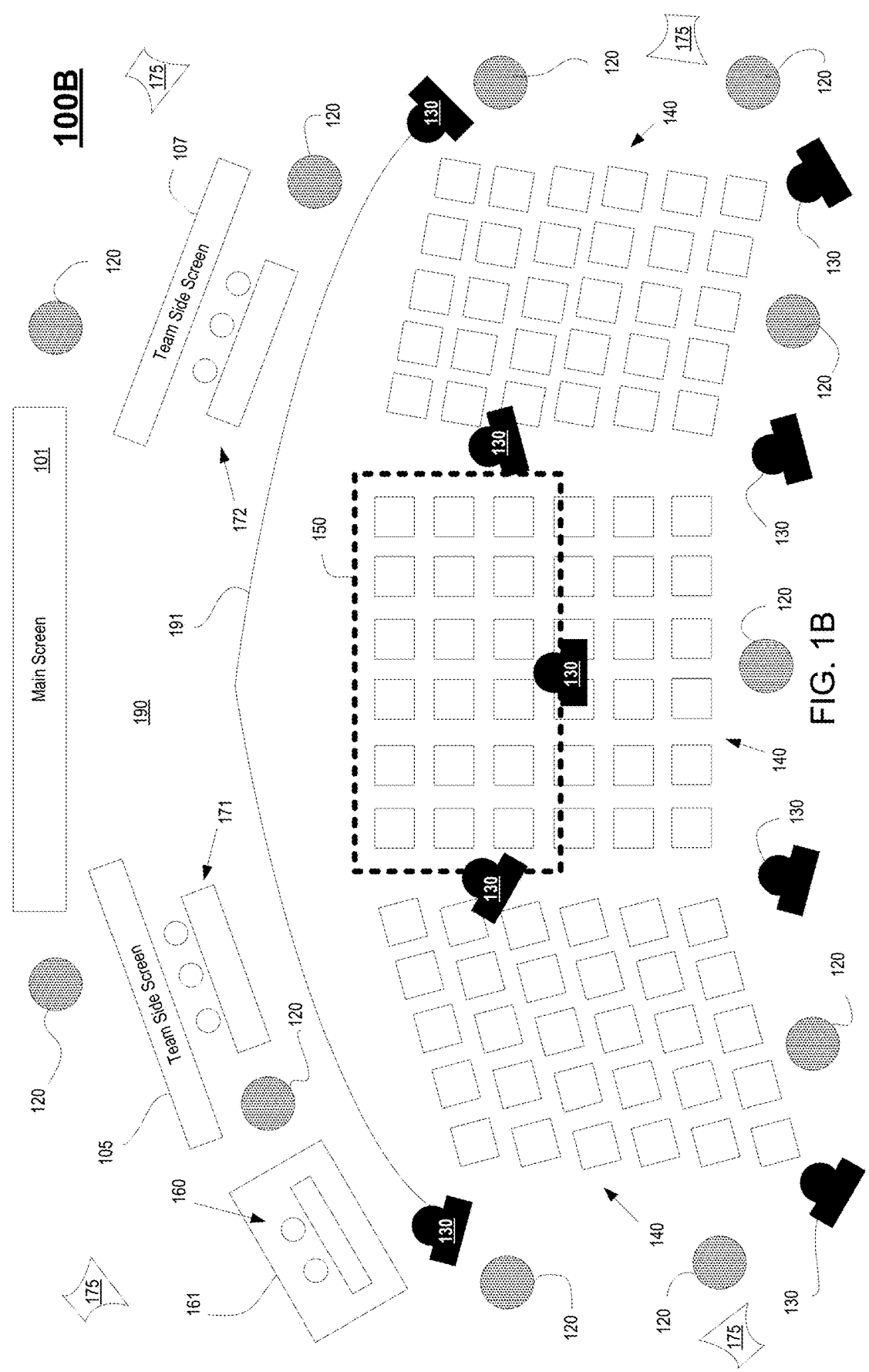
FIG. 1B illustrates a floor plan view of the eSports arena including the locations of video and audio data collection devices, in accordance with one embodiment of the present disclosure.

FIG. 1B illustrates a floor plan 100B view of the eSports arena 100 introduced in FIG. 1A, and includes the locations of video and audio data collection devices, in accordance with one embodiment of the present disclosure. The front 191 of stage 190 is presented in front of the arena seating 140. The stage 190 includes a first podium seating the first team 171 and a second podium seating the second team 172. Located about the stage 190, a side display 105 is located above team 171, and side display 107 is located above team 172, as previously described. The main display 101 is shown at a location in the center of stage 190. In addition, stage 190 supports tower 161 that holds the broadcasters 160.

A plurality of data collection devices is shown. For example, one or more audio collection devices 120 (e.g., recorders) are located throughout the eSports arena 100, as illustrated in map 100B. In that manner, audio from the professional gamers may be recorded, as well as audio from the audience in general, or from individual audience members. That is, the audio collection devices 120 are positioned to best pick up sounds from a desired target. The audio collected may be routed back to the speakers 175 for increased audience projection. Speakers 175 also provide audio in conjunction with the images presented on the displays 101, 105, and 107. Further, the audio collected may be used within a live view of the eSports event. In addition, the audio collected may be used to support a virtual view of the live eSports event, or an augmented view of the live eSports event.

In addition, one or more video collection devices 130 (e.g., video cameras) are located throughout eSports arena 100, as illustrated in map 100B. In that manner, video from the live eSports event may be recorded. This may include wide angled views and close-up views of the audience members, individual audience members, the teams 171 and 172, individual gamers on the teams 171 and 172, the stage 190, the screens 101, 105 and 107 on stage 190, etc. In particular, the images recorded from the video collection devices may be used to generate virtual views of the live eSports event, as presented from a location from anywhere in the eSports arena (e.g., from a selected seat in arena seating 140). The virtual views of the live eSports event may be stitched together from video recordings taken from one or more video collection device 130. Because the virtual experience of the live eSports event generated for the VIP section 150 is intended to be more immersive, additional video collection devices 130 may be assigned to record images from locations in or about VIP section 150. In that manner, more detailed POVs may be generated for each of the seats in the VIP section 150 based on videos from a large number of video collection devices, instead of the one or two views assigned to the seats in VIP section 150 that are stitched from a minimum amount of video collection devices 130.

Figure 2A:
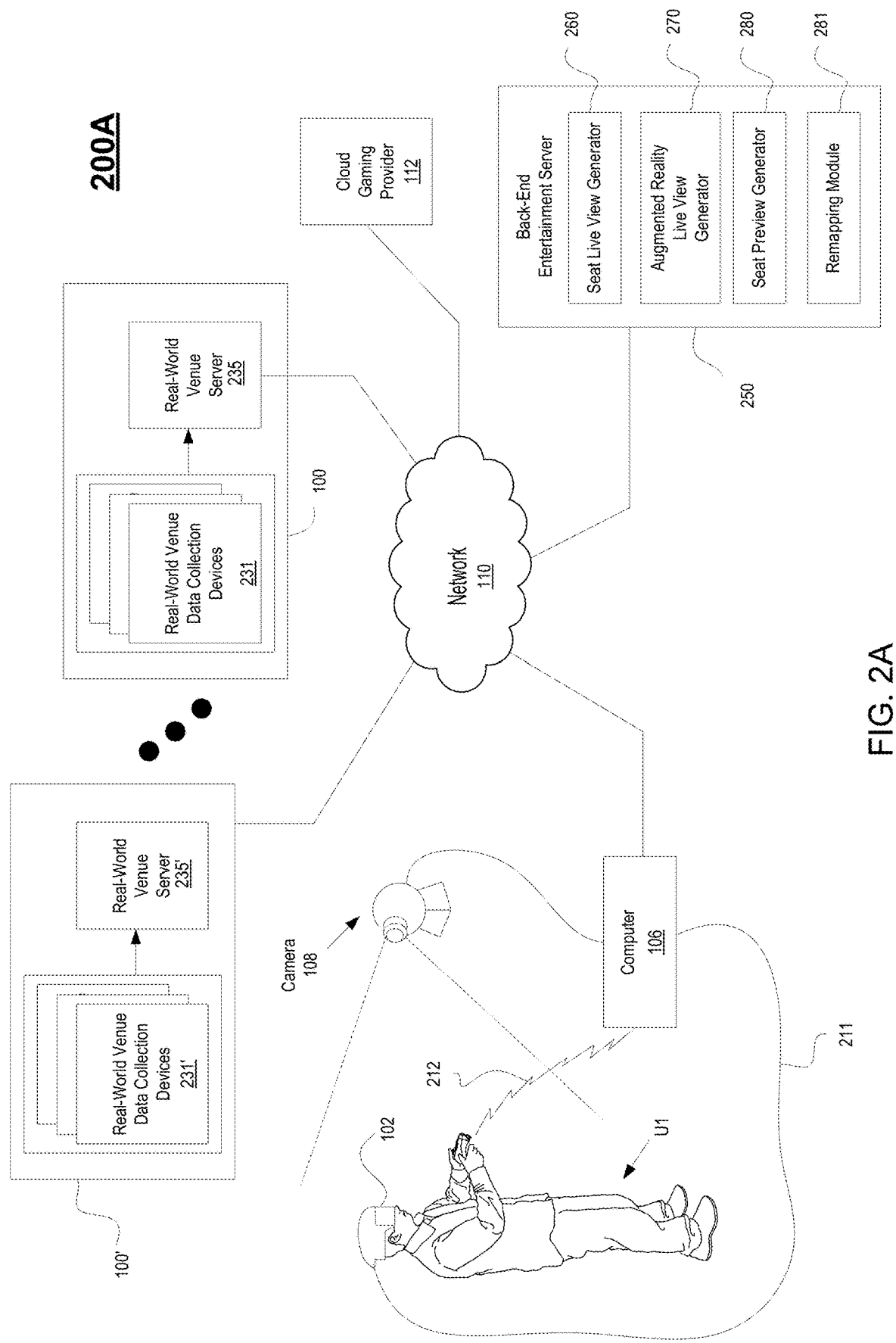
FIG. 2A illustrates a system configured for providing an interactive experience with VR content, such as an eSports live event (e.g., video gaming competition), in accordance with one embodiment of the present disclosure.

FIG. 2A illustrates a system for remote participation in a live eSports event, such as a video gaming competition, in accordance with an embodiment of the invention. A user U1 is shown wearing a head-mounted display (HMD) 102. The HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, HMD 102 is configurable to present a live view of the eSports event. The live view may be generated from real-world venue data collection devices 231 located at the real-world venue 100 (e.g., eSports arena), as managed by a real-world venue server 235. The server 235 may be local to the venue or remote from the venue. In a truly or near live view, the live view is generated with minimal or no modification to the collected data. That is, the near live view is similar to viewing a live traditional sporting event (e.g., basketball, baseball, boxing, football, tennis, etc.) over a network, except that the near live view is projecting views as collected within the real-world venue.

The collected data may be collected in a format ready for display using an HMD, or may be formatted for display within the HMD. In other embodiments, the view presented by the HMD is a hybrid and/or augmented reality view of the live event that is modified to present a live view from a specific location in the arena 100, and may be augmented with digital data or transformation. That is, the hybrid view is generated from live views collected from data (e.g., video) collection devices 231 (e.g., video collection, camera, audio recorder, speaker, temperature monitor, pressure monitor, etc.) throughout the arena 100. The hybrid view may be stitched from the live views, and present a more traditional video or image to the user U1. That is, the hybrid view may not be considered as virtual. In some embodiments, the hybrid view may be an augmented reality view that is generated in part from the live views collected from the data collection devices 231. That is, the augmented reality view inserts digital content into the live view collected by the data collection devices and minimally modified, as previously described. In still other embodiments, the hybrid view presented by the HMD is a virtual view of the live event that is generated from the live views collected from the data collection devices 231. That is, the virtual view is a digital representation of the live eSports event.

In one embodiment, the information gathered from the data collection devices 231 and the real-world venue server 235 are delivered to a back-end entertainment server 250, such as over network 110. In one embodiment, entertainment server is configured for generating the live and hybrid views, previously introduced, for various locations (e.g., POVs corresponding to seating locations in arena 100). In particular, entertainment server includes a seat live view generator 260 that is configured for generating live views of the live event occurring at the eSports arena. The live view generator 260 may generate live views for any location within the arena, such as using stitching technologies that stitch data (e.g., audio and/or video) collected from multiple sources. In addition, entertainment server includes an augmented reality live view generator 270 that is configured to overlay digital content over the live views of the live eSports event. For instance, a remote user participating in the live eSports event as a virtual audience member may view a digital avatar representation of another remote user (e.g., a social network friend to user U1) sitting in the adjacent seat, as viewed through an augmented live view of the eSports live event. Also, entertainment server includes a seat preview generator 280 that is configured for presenting a preview of the live and/or hybrid view that may be experienced by user U1 in association with POVs for one or more selected seats in arena 100. Specifically, as the user U1 navigates through a preview interface to select a seat in the arena seating 140, an option may be provide to show a preview of the live and/or hybrid view generated for that seat. The user U1 may select a given seat through the same interface. Further, the entertainment server includes a remapping module 281 configured to change the mapping schedule of components and devices used for generating the live and/or augmented reality views of the real-world venue when a remote participant changes viewing locations (e.g., changing a seat in the virtual or augmented representation of the real-world venue). That is, when the viewing location is changed, different sets of capture devices may be used to generated the live, hybrid, and/or augmented views. For example, different sets of video capture devices, audio capture devices, speakers, etc. may be used when generating views for a first location and a second location within the real-world venue. As such, the remapping module 281 is configured to determine the appropriate capture devices used for generating views for a particular location, and assigning those devices during a remapping for purposes of generating the appropriate live, hybrid, and/or augmented reality views for the new location. In some embodiments, the functions and features provided in the entertainment server 260 and real-world venue server 235 may be performed at one location, such as real-world venue server(s) or the entertainment server(s).

In one embodiment, the HMD 102 can be connected to a computer 106. The connection to computer 106 can be wired over connection 211 or wireless over connection 212. The computer 106 can be any general or special purpose computer known in the art, including but not limited to, a gaming console, personal computer, laptop, tablet computer, mobile device, cellular phone, tablet, thin client, set-top box, media streaming device, etc. In the traditional sense, the computer 106 can be configured to execute a video game, and output the video and audio from the video game for rendering by the HMD 102. Execution of the video game may be further supported by a cloud gaming network 200 that is configured for maintaining and executing a video game being played by one or more users, such as in a MOG, or massively multi-player online game (MMOG). For instance, the cloud gaming network 200 may support the video game being played within the live eSports event. In some embodiments, the functions and features provided in the entertainment server 260 and cloud gaming network 200 may be performed at one location, such as the cloud gaming network 200 or the entertainment server(s) 260. In addition, the computer 106 may be configured to receive live and/or hybrid views of the eSports live event as delivered to remote user U1. That is, the computer 106 is not restricted to executing a video game but may also be configured to execute an interactive application, which outputs VR content (e.g., live and/or hybrid views of the sports live event) for rendering by the HMD 102.

The user 100 may operate a controller 104 to provide input for controlling the interactive experience when participating in the live and/or hybrid view of the live eSports event. For example, the controller may be used to select a seat within the arena seating 140, or to select a preview of a live and/or hybrid view corresponding to a selected seat. In addition, controller 104 may be used to provide input into an executing video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with the entertainment server 250. That is, the server 250 generates the live and/or hybrid views shown by the HMD 102, and the computer 106 transmits inputs from the HMD 102, controller 104, and camera 108 to the server 250. The output from the entertainment server, such as video, data, audio data, digital data, is transmitted to computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In a more traditional sense, the computer 106 may function as a thin client in communication over the network 110 with the cloud gaming provider 112. The cloud gaming provider 112 maintains and executes a video game being played by the user U1. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the entertainment server 250 and/or cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless. The cloud gaming provider 112 processes the inputs to affect the game state of the executing video game. The output from the executing video game, such as video data, audio data, and haptic feedback data, is transmitted to the computer 106 for onward transmission to the respective devices. In other embodiments, computer 106 may be configured to execute a video game that has been downloaded. Computer 106 may work cooperatively with cloud gaming provider 112 to execute the video game. For example, execution of the video game may start on the cloud gaming provider 112, and once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108.

In one embodiment, multiple live events may be available to one or more remote users. For instance, a live event may be occurring at the real-world venue 100'. The real world venue 100' is similarly configured as venue 100, and includes a real-world venue server 235' and one or more data collection devices 231'. As such, the remote user U1 may be able to participate in multiple live events, by hopping from one event to another event. That is, the remote user U1 is able to experience a live, hybrid, and/or augmented reality view of the live event occurring at real-world venue 100 from a selected seat in the venue, and then hop to another live event occurring at real-world venue 100' to have another, different experience of that live event. As an example, on any given Sunday multiple live events may be occurring (e.g., football, soccer, etc.), and a remote user may hop from one live event to another live event to experience different live, hybrid, and/or augmented reality views of selected events.

In still another embodiment, a remote user U1 may experience a recorded event. That is, the remote user may wish to view a previously recorded event in the same manner as described above. In that manner, the remote user may still access live (previously recorded, and live to the viewer), hybrid, and/or augmented reality views of the previously recorded event. Because the data has been captured and stored, these views can be regenerated after the event has occurred and streamed to the remote user. As before, the remote user may select a particular location (e.g., seat) in the real-world venue, and move to a different location, to gain views of the now recorded event. In another embodiment, a group of remote users may wish to experience the recorded event through a recording session. That is, the group of remote users may be located at different physical locations. The recording session generates a new play of the recorded event with a common timeline for all users in the group. As such, each of the group of users may have their own live (previously recorded, and live to the viewer), hybrid, and/or augmented reality views of the previously recorded event that is aligned in time with the other users in the group. For example, the group of users may experience a music concert together in the virtual or augmented reality space. In that manner, the group of users may select seating in one area of the virtual representation of the real-world venue, and be able to see representations of the other users in the group within their view of the recorded event. Further, users in the group would be able to interact with each other in the real-world, such as holding a real-world conversation while viewing the recorded event.

Figure 2B:
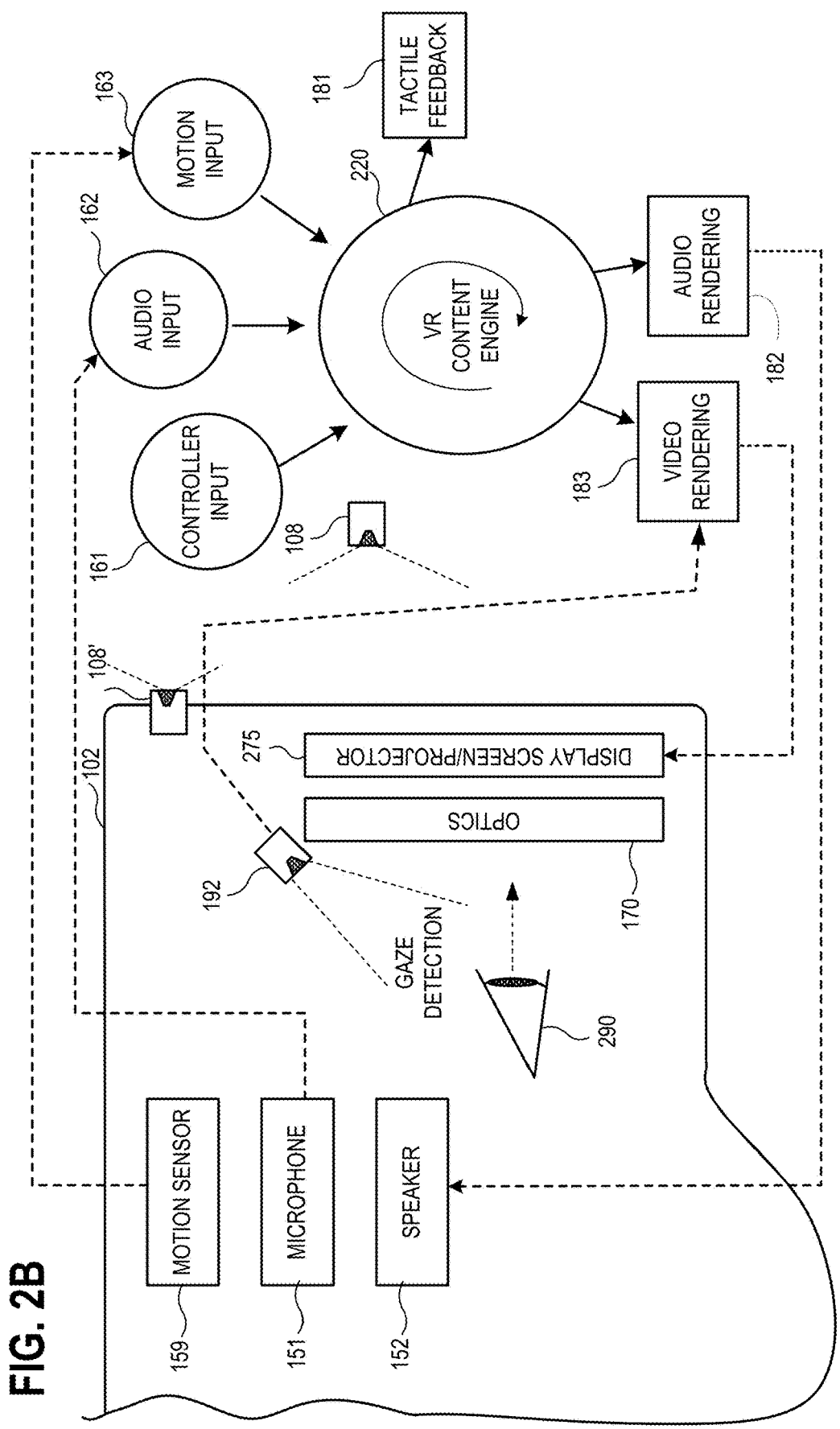
FIG. 2B conceptually illustrates the function of a HMD in conjunction with the display of VR content, such as an eSports live event (e.g., video gaming competition), in accordance with an embodiment of the invention.

FIG. 2B conceptually illustrates the function of a HMD 102 in conjunction with the generation of VR content (e.g., execution of an application generating live and/or hybrid views of a live eSports event, and/or video game, etc.), in accordance with an embodiment of the invention. In some implementations, the VR content engine 220 is being executed and/or generated on a back-end entertainment server 250 that is communicatively coupled to the HMD 102 via a computer 106 (not shown). In some embodiments, the computer 106 executes and/or generates part of the VR content. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 220 executing an application may be a live and/or hybrid view selection and/or generation engine, wherein the live and/or hybrid view is related to an eSports live event. In a more traditional sense, the VR content engine may be a video gaming engine executing a video game, and is configured to receive inputs to update a game state of the video game. The following description of FIG. 1B is described within the context of the VR content engine 220 executing a video game, for purposes of brevity and clarity, and is intended to represent the execution of any application capable of generating VR content. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the VR content engine 220 receives, by way of example, controller input 161, audio input 162 and motion input 163. The controller input 161 may be defined from the operation of a gaming controller separate from the HMD 102, such as a hand-held gaming controller 104 (e.g. Sony DUALSHOCK®4 wireless controller, Sony PlayStation ®Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. The VR content engine 220 (e.g., executing a gaming application) receives inputs which are processed according to the configuration of the game engine to update the game state of the video game. The engine 220 outputs game state data to various rendering modules which process the game state data to define content which will be presented to the user.

In the illustrated embodiment, a video rendering module 183 is defined to render a video stream for presentation on the HMD 102. A lens of optics 170 in the HMD 102 is configured for viewing the VR content. A display screen 275 is disposed behind the lens of optics 170, such that the lens of optics 170 is between the display screen 275 and an eye of the user, when the HMD 102 is worn by the user. In that manner, the video stream may be presented by the display screen/projector mechanism 275, and viewed through optics 170 by the eye 290 of the user. An HMD user may elect to interact with the interactive VR content (e.g., VR video source, video game content, etc.) by wearing the HMD and selecting a live and/or hybrid view of the eSports live event, or a video game for game play, for example. Interactive virtual reality (VR) scenes are rendered on the display screen 175 of the HMD. In that manner, the HMD allows the user to be completely immersed in the live and/or hybrid view of the eSports live event, or game play of a gaming application, by provisioning display mechanism of the HMD in close proximity to the user's eyes. The display regions defined in the display screen of the HMD for rendering content may occupy large portions or even the entirety of the field of view of the user. In one embodiment, the lens of optics 170 and display screen are disposed within a support structure of the HMD 102 that is configured to fit around the head of the user, such as user 102, when the support structure is worn. Further, the lens of optics 170 and display screen 175 are disposed within the support structure, such that the display screen 175 is located in front of one or both eyes of the user when the HMD 102 is worn. Typically, each eye is supported by an associated lens of optics 170 which is viewing one or more display screens.

An audio rendering module 182 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 192 is included in the HMD 102 to enable tracking of the gaze of the user. Although only one gaze tracking camera 192 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 192, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 181 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

In one embodiment, the video rendering 183 and audio rendering 182 may be configured to present a live and/or hybrid view of a live eSports event as displayed within HMD 103. For example, the live and/or hybrid view may be generated from a POV of a specific seat in the arena seating 140 of an eSports arena 100 of FIG. 1A. As previously described, the live view may be recorded from one or more captured views of the eSports arena, and presented with minimal modification as a POV of a selected seat. In another embodiment, a hybrid view may be generated by stitching one or more captured views of the eSports arena. Another hybrid view may be generated by incorporating digital content into the stitched live view, such as in the form of providing augmented reality views. For example, a digitized form of a friend to a user U1 is presented in the augmented reality view of U1). In still other embodiments, a completely virtual view of the live eSports event is presented in HMD 102.

Figure 3A:
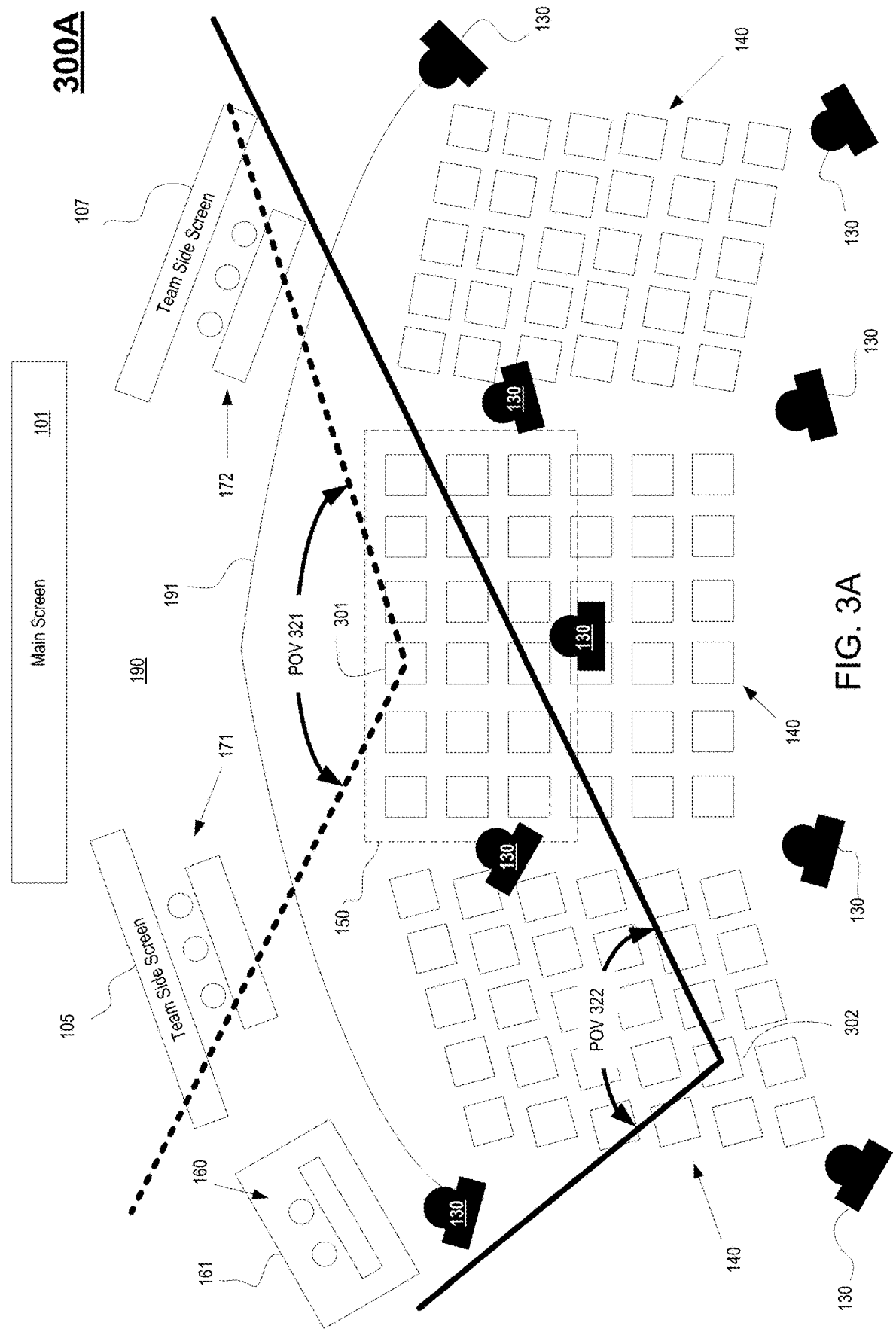
FIG. 3A illustrates a floor plan view of the eSports arena introduced in FIG. 1B, and includes two point-of-views (POVs) generated from two seats in the eSports arena, in accordance with one embodiment of the present disclosure.

FIG. 3A illustrates a floor plan view 300A of the eSports arena 100 introduced in FIG. 1B, and includes two point-of-views (POVs) generated from two seats in the eSports arena, in accordance with one embodiment of the present disclosure. As shown and briefly discussed, floor plan view 300A includes front 191 of stage 190, arena seating 140 including a VIP section 150, main display 101, side display 105, side display 107, podium for the first team 171, podium for the second team 172, and tower 161 for seating broadcasters 160. A plurality of video data collection devices 130 is also shown positioned throughout arena 100 to collect video of the live eSports event. In addition, audio collection devices (not shown) may be located throughout arena 100 to collect audio recordings related to the eSports event.

A POV 321 is associated with seat 301 of the arena seating 140. POV 321 may be generated from one or more live video recordings. For instance, POV 321 may be generated from the video recordings of 3-6 video collection devices that can be used for reproducing the live view from seat 301. That is, the live and/or hybrid views (e.g., real, augmented reality, virtual) views of the live eSports event may be stitched together from video recordings taken from one or more video collection device 130. Because seat 301 is located within the VIP section 150, there may be more video recordings available to give a high quality rendering of the live view for each seat within the section. That is, in VIP section 150, each seat may have a uniquely generated viewing into the live eSports event. Outside of VIP section 150, a group of co-located seats (e.g., 10-20 seats) may share a uniquely generated viewing into the live eSports event. As shown, POV 321 includes a close-up view of the stage 190, and includes close views to both teams and all three displays. Because seat 301 is near the front of stage 190, the POV 321 is more desirable for providing unobstructed, large, and clear views to stage 190.

A POV 322 is associated with seat 302, wherein POV 322 may be also be generated from one or more live video recordings. For instance, POV 322 may be generated from the video recordings of 1-2 video collection devices that can be used for reproducing the live view from seat 302. That is, the live and/or hybrid views (e.g., real, augmented reality, virtual) views of the live eSports event may be stitched together from video recordings taken from one or more video collection device 130. Because seat 302 is located near the back of the arena 100, there may be limited video recordings available to give a rendering of the live view for each seat within the section. Though the rendered live view is of a high quality, the resolution of views between seats the back of the arena may be limited. That is, for seats located in the back of arena 100, and outside of VIP section 150, a group of co-located seats (e.g., 10-20 seats) near seat 302 may share a uniquely generated viewing into the live eSports event. As shown, POV 322 includes a far-away view of the stage 190, and includes far-away views to both teams, the three displays, and the broadcasting booth. Because seat 302 is near the rear of arena 100, the POV 322 is less desirable because the views may be slightly obstructed, and far-away from stage 190.

Though FIG. 3A is described in relation to providing video images for the live and/or hybrid views into the eSports live event, other embodiments are well suited to providing live and/or hybrid audio for the live eSports event that are based on a selected seat in eSports arena 100. In addition, the live and/or hybrid audio may be combined with the live and/or hybrid video for the eSports live event, and presented to a remote user who is participating in the live eSports event as a virtual audience member, for example.

Figure 3B:
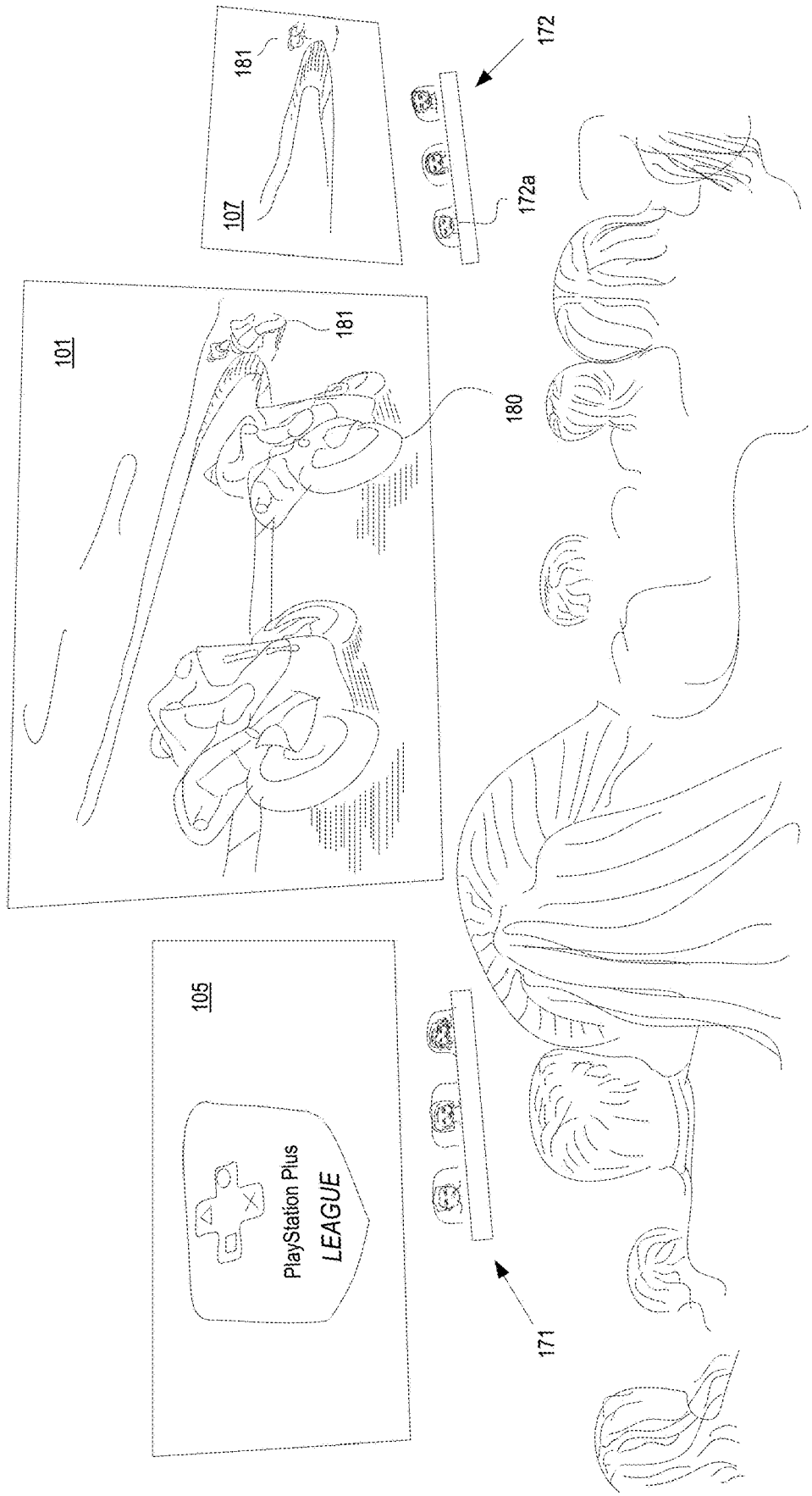
FIG. 3B illustrates a POV generated from a back seat in the eSports arena, in accordance with one embodiment of the present disclosure.

FIG. 3B illustrates an image of a video sequence shown in an HMD of a remote user (e.g., U1) that is participating in an eSports live event as a virtual audience member, wherein the image is generated from a POV 322 associated with a back seat (selected by the remote user) in the eSports arena, in accordance with one embodiment of the present disclosure. For example, the selected seat is seat 302 in the arena seating 140 of eSports arena 100 as shown at least in the floor plan view 300A of FIG. 3A.

As previously discussed, the video portion of POV 322 that is shown in an HMD of the remote user is generated from one or more live video recordings captured by one or more video collection devices. For instance, the live video recordings may be stitched together to generate a video sequence of images having a point-of-view associated with seat 302. For instance, because seat 302 is near the back of the eSports arena 100, POV 322 has a far-away view of the stage 190. As such, the members of the first team 171 of professional gamers and of the members of the second team 172 of professional gamers appear small and distant. In addition, other audience members (e.g., live participants or digitally inserted) within POV 322 shown in the HMD may obstruct at least part of the view of the stage 190. As shown in FIG. 3B, the heads of multiple audience members is shown in POV 322. Further, in POV 322 the remote user has an unobstructed view of the displays located on or about stage 190. For example, POV 322 includes a view of the main display 101 showing racers on a motorcycle course (e.g., at least racers 180 and racers 181). POV 322 includes a view of the side display 105 (e.g., showing the PlayStation Plus LEAGUE logo) that is located above the first team 171. Also, POV 322 includes a view of the side display 107 showing the game play view of the team member 172a controlling motorcycle racer 180. As previously described, side display shows the viewpoint of motorcycle racer 180 including a view of the back of motorcycle racer 181, wherein racer 181 is ahead of motorcycle racer 180 on the racecourse.

Figure 3C:
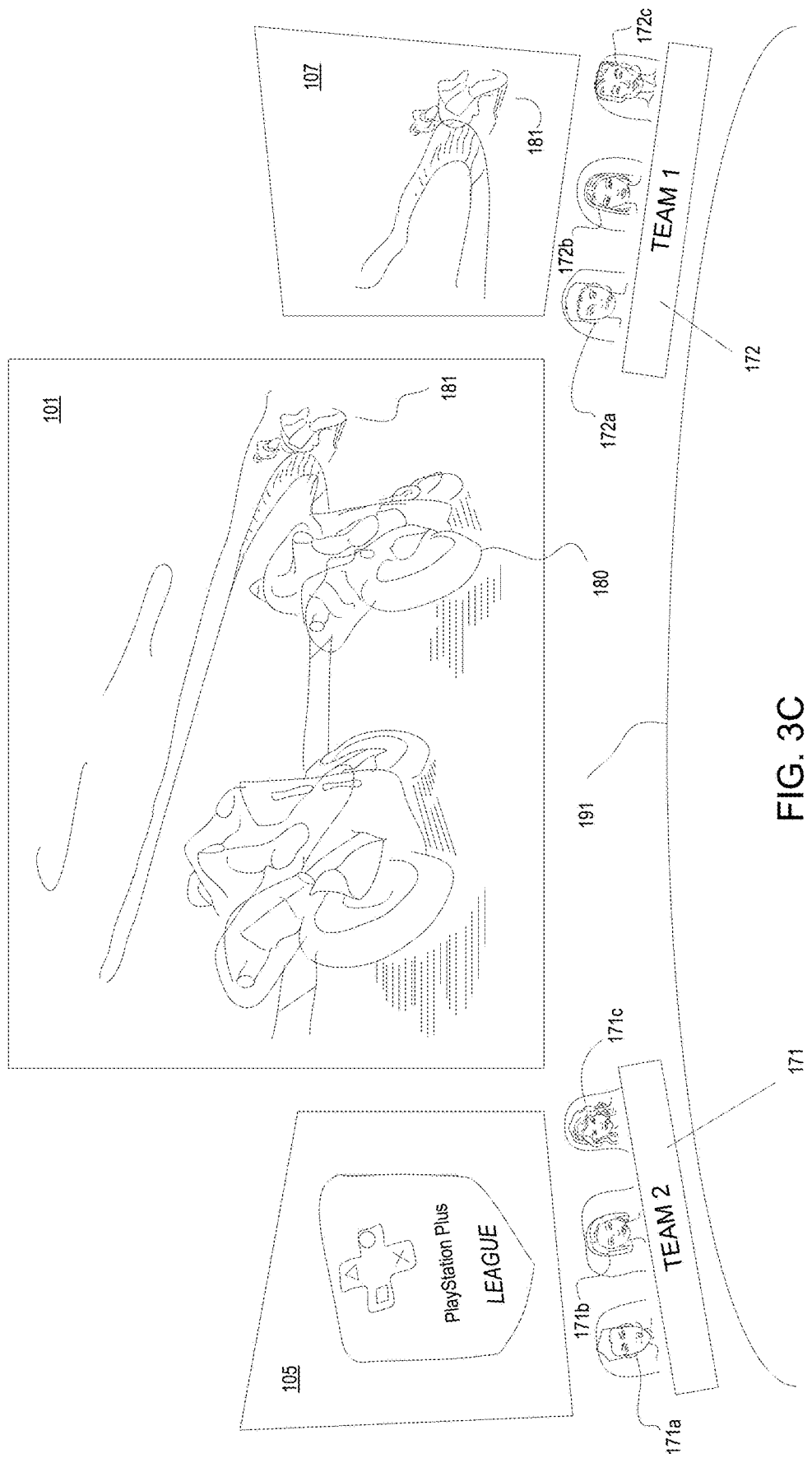
FIG. 3C illustrates a POV generated from a front row VIP seat in the eSports arena, in accordance with one embodiment of the present disclosure.

FIG. 3C illustrates an image of a video sequence shown in an HMD of a remote user (e.g., U1) that is participating in an eSports live event as a virtual audience member, wherein the image is generated from a POV 321 associated with a front row seat (selected by the remote user) in the eSports arena, in accordance with one embodiment of the present disclosure. For example, the selected seat is seat 301 in the VIP section 150 of arena seating 140 of eSports arena 100 as shown at least in the floor plan view 300A of FIG. 3A.

As previously discussed, the video portion of POV 321 that is shown in an HMD of the remote user is generated from one or more live video recordings captured by one or more video collection devices. For instance, the live video recordings may be stitched together to generate a video sequence of images having a point-of-view associated with seat 301. Because seat 301 is located in VIP section 150, a higher number of live video recordings may be captured to generate POV 321 in comparison to the number of recordings captured for generating POVs for seats outside the VIP section. In particular, because seat 301 is at or near the front of eSports arena 100, POV 321 has a close-up view of stage 190. That is, the view of the user from seat 301 is not obstructed by other audience members (e.g., live or digitally augmented), and the stage and objects on the stage appear large and clear to the viewer. For example, the members of the first team 171 of professional gamers is clearly shown in POV 321, wherein faces of the members are clearly identifiable, including a male gamer 171a with cropped hair, a female gamer 171b with short hair, and a female gamer 171c with long hair. Also, members of the second team 172 of professional gamers is clearly shown in POV 321, wherein faces of the members are clearly identifiable, including a male gamer 172a with short hair, a female gamer 172b with short hair, and a male gamer 172c with short hair. Further, in POV 321, the remote user has a clear and large view of the displays located on or about stage 190. For example, POV 321 includes a large view of the main display 101 showing at least racers 180 and racers 181. POV 322 includes a clear and large view of side display 105 (e.g., showing the PlayStation Plus LEAGUE logo) that is located above the first team 171. POV 322 also includes a clear and large view of side display 107 showing the game play view of the team member 172a controlling motorcycle racer 180 (including a view of the back of motorcycle racer 181).

When comparing FIGS. 3B and 3C, the POV 321 of front row seat 301 has a clearer view of stage 190 than the POV 322 of rear seat 302. This is similar to the experience of audience members that are attending a concert in a concert arena, or those attending a movie in a theater, or those attending a Broadway show in a theater, or those attending any event in any type of arena. As such, the experience of a remote user selecting seat 301 may be more vivid than a user selecting seat 302.

Figure 4A:
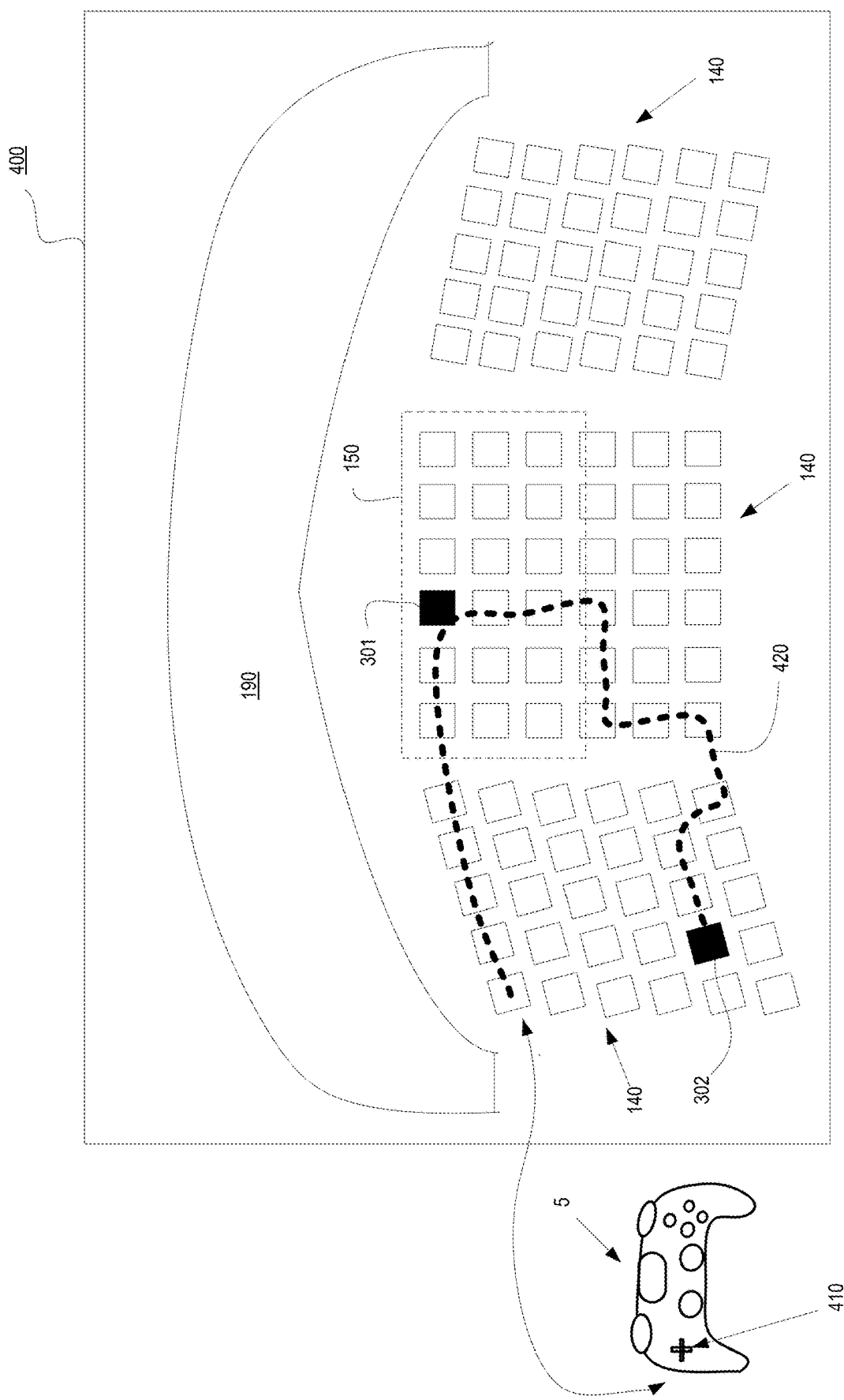
FIG. 4A illustrates the selection process for selecting one or more seats in the eSports arena, one seat at a time, for purposes of generating previews of the eSports live event taken from the viewpoint of a selected seat, in accordance with one embodiment of the present disclosure.

FIG. 4A illustrates the selection process for selecting one or more seats in the eSports arena, one seat at a time, for purposes of generating previews of the eSports live event taken from the viewpoint of a selected seat, in accordance with one embodiment of the present disclosure. For example, the remote user U1 of FIG. 2A communicates with the back-end entertainment server 250 for purposes of participating in a live eSports event as a virtual audience member. In particular, user U1 interfaces with seat preview generator 280 in order to preview the POVs from one or more seats in arena seating 140 of the eSports arena 100 previously introduced. The preview and seat selection process shown in FIG. 4A is exemplary, and is intended to show the ability to preview POVs of seats in arena seating 140.

As shown in FIG. 4A, user U1 may use controller 5 to interact with interface 400 that may be generated by seat preview generator 280. For instance, interface 400 shows a floor plan view of the stage 190 and seating 140 of the eSports arena 100. Using the directional buttons 410 on controller 5, user U1 may navigate through the arena seating 140 to select one or more seats for purposes of obtaining a preview of respective POVs. Other means for navigating through the floor plan view showing the arena seating are contemplated, such as using an analog stick, a touch screen, etc. For example, path 420 shows the navigation by user U1 through arena seating 140 as presented in the interface 400. Path 420 travels across the first row of seats from left to right, and first settles on seat 301 in VIP section 150 to obtain a POV preview, as will be described in FIG. 4B. Path 420 may continue onto seat 302 to obtain a POV preview, as will be described in FIG. 4C.

Figure 4B:
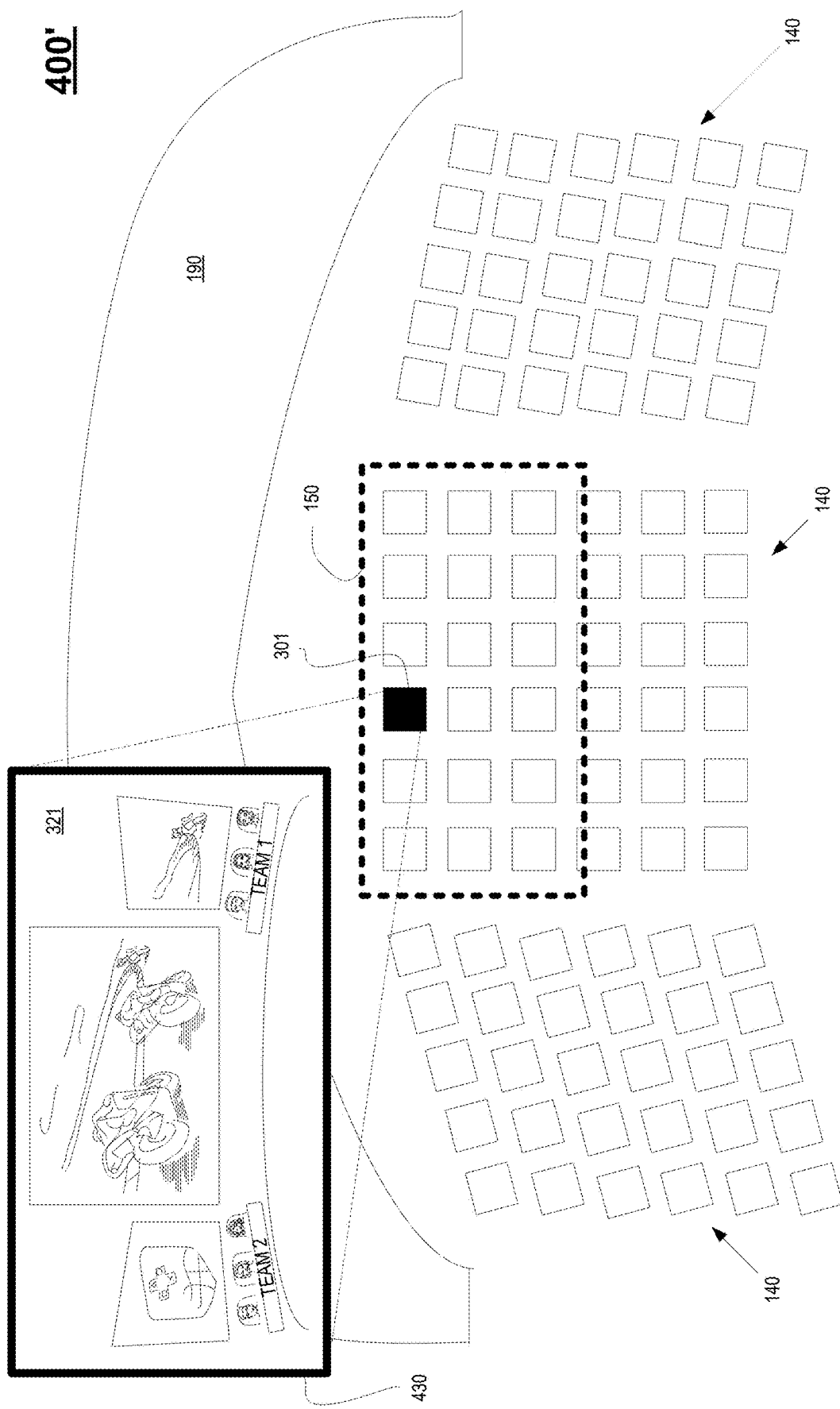
FIG. 4B illustrates a preview of the POV introduced in FIG. 3C that is generated from a front row VIP seat in the eSports arena shown in relation to a seating map of the eSports arena, in accordance with one embodiment of the present disclosure.

FIG. 4B illustrates a preview of the POV 321 introduced in FIG. 3C that is generated from a front row seat 301 in the VIP section 150 of the eSports arena 100, in accordance with one embodiment of the present disclosure. The preview of POV 321 is shown in relation to a floor plan view of the eSports arena as provided in interface 400'. In particular, user U1 has selected seat 301 in interface 400 of FIG. 4A and desires a preview of the POV from that seat. As such, interface 400' of FIG. 4B provides a preview window 430 that shows the POV 321 that is generated for seat 301, wherein the image shown in POV 321 was previously described at least in FIG. 3C. That is, a user selecting seat 301 would ultimately receive and view POV 321 in an HMD worn by the user. That is, preview window 430 shows a sampling of the POV 321 experienced by a user sitting in seat 301.

Figure 4C:
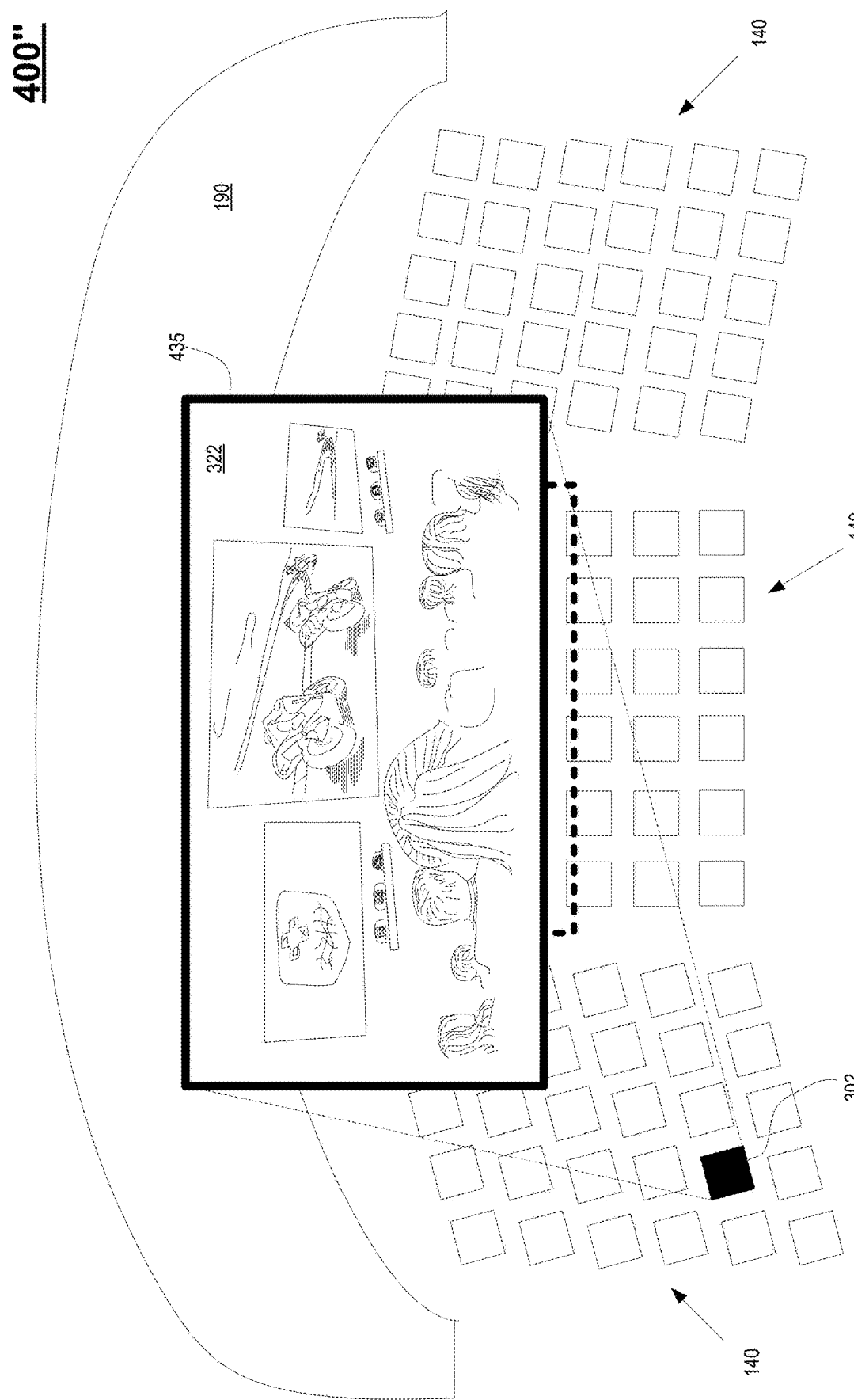
FIG. 4C illustrates a preview of a POV introduced in FIG. 3B that is generated from a back seat in the eSports arena shown in relation to a seating map of the eSports arena, in accordance with one embodiment of the present disclosure.

FIG. 4C illustrates a preview of a POV 322 introduced in FIG. 3B that is generated from a back seat 302 in the eSports arena 100, in accordance with one embodiment of the present disclosure. The preview of POV 322 is shown in relation to a floor plan view of the eSports arena as provided in interface 400". In particular, user U1 has selected seat 302 in interface 400 of FIG. 4A and desires a preview of the POV from that seat. As such, interface 400" of FIG. 4C provides a preview window 435 that shows the POV 322 that is generated for seat 302, wherein the image shown in POV 322 was previously described at least in FIG. 3B. That is, a user selecting seat 302 would ultimately receive and view POV 322 in an HMD worn by the user. That is, preview window 435 shows a sampling of the POV 322 experienced by a user sitting in seat 302.

Figure 5A:
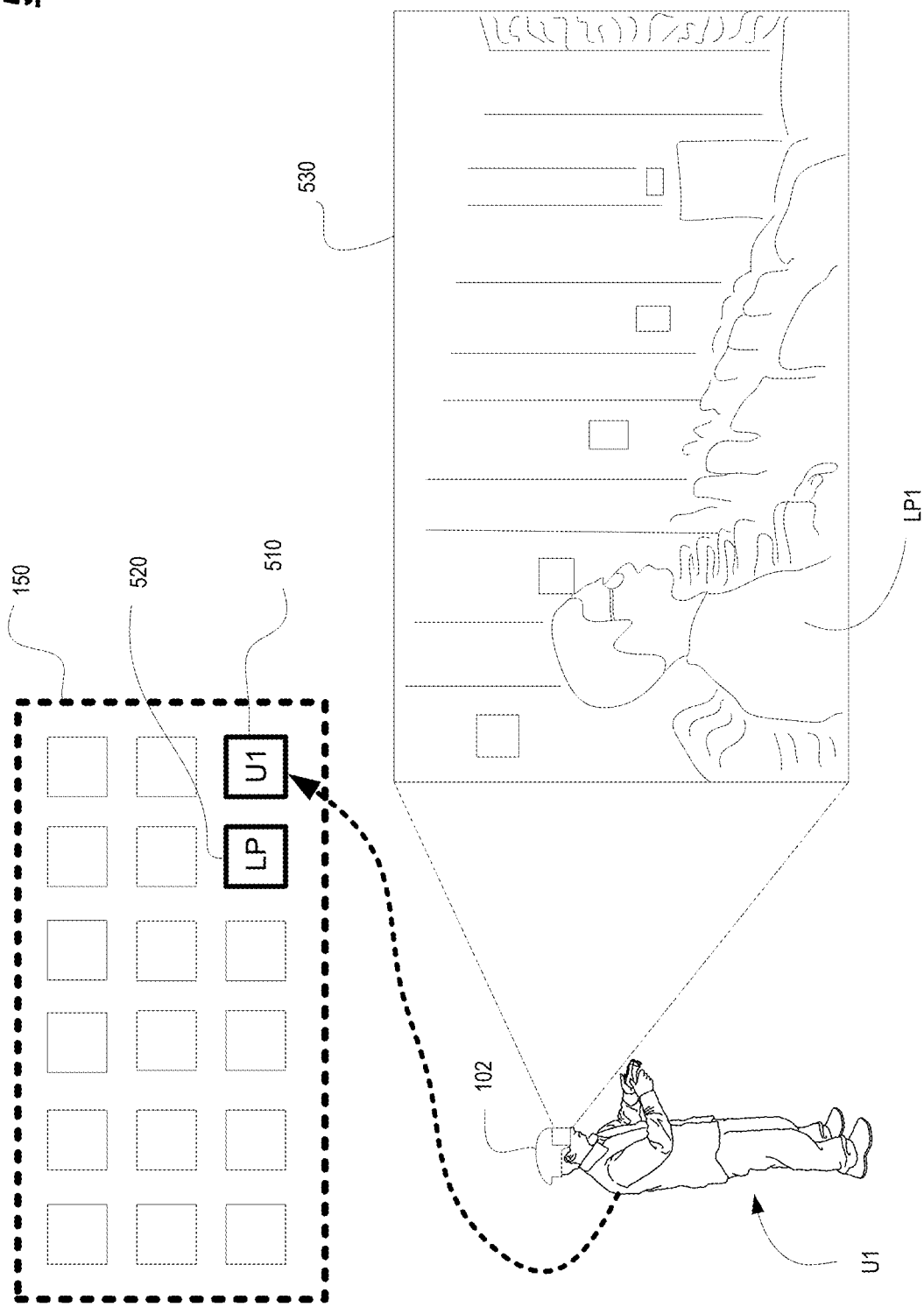
FIG. 5A illustrates a POV of a remote user U1 participating in the eSports live event (e.g., video gaming competition) and virtually seated at one of the physical seats in the eSports arena, wherein as the remote user looks to the left, the POV of the remote user U1 includes a view of a live participant (LP) audience member, in accordance with one embodiment of the present disclosure.

FIG. 5A illustrates a POV of a remote user U1 participating in the eSports live event (e.g., video gaming competition) and virtually seated at one of the physical seats in the eSports arena, wherein as the remote user looks to the left, the POV of the remote user U1 includes a view of a live participant (LP) audience member, in accordance with one embodiment of the present disclosure. In particular, the remote user U1 is able to participate in a live eSports event, such as from the comforts of a living room in the house of U1. As such, after selection of a seat in the eSports arena, user U1 is presented with a POV of the live event as taken from the selected seat as viewed through an HMD 102. In that manner, user U1 is able to participate in the live eSports event, as if he or she were actually sitting in the eSports arena in the selected seat.

As previously described, a live and/or hybrid view of the live eSports event may be generated and presented to the user U1 through an HMD. For example, the live or nearly live view may take unprocessed or minimally processed audio and video recordings of the live event, such as the recording from one or more data collection devices. That is, the nearly live or live view is generated with minimal or no modification to the collected data, such as when viewing a live traditional sporting event through multiple television recording cameras. In addition, the hybrid view of the live eSports event may be generated from the live views collected from data collection devices (e.g., audio, video, etc.) located throughout the eSports arena. In one implementation, the hybrid view may stitch together one or more live video recordings, as well as one or more audio recordings. In another embodiment, a hybrid view is presented as augmented reality that is generated in part from the live views collected from one or more data collection devices, and that includes digital content that is inserted into the live view, wherein the live view may be generated by stitching together one or more live views collected from data collection devices. In still another embodiment, the HMD may present an entirely virtualized view of the live eSports event, wherein the virtualized view is a digital representation of the live eSports event.

In particular, FIG. 5A shows that user U1 has selected seat 510 in the VIP section 150 of eSports arena 100. Directly to the left of seat 510 is seat 520. A live participant (e.g., audience member) is actually sitting in seat 520. FIG. 5A shows the immersive experience of user U1, as the POV 530 shown in HMD 102 represents a view as the user U1 looks to the left in the eSports arena 100. The user U1 is virtually transported into the eSports arena 100 and should have an experience not unlike as if user U1 was actually sitting in seat 510. As such, POV 530 that is shown in HMD 102 would include a view of the live participant (LP1) that is actually seated in seat 520.

Figure 5B:
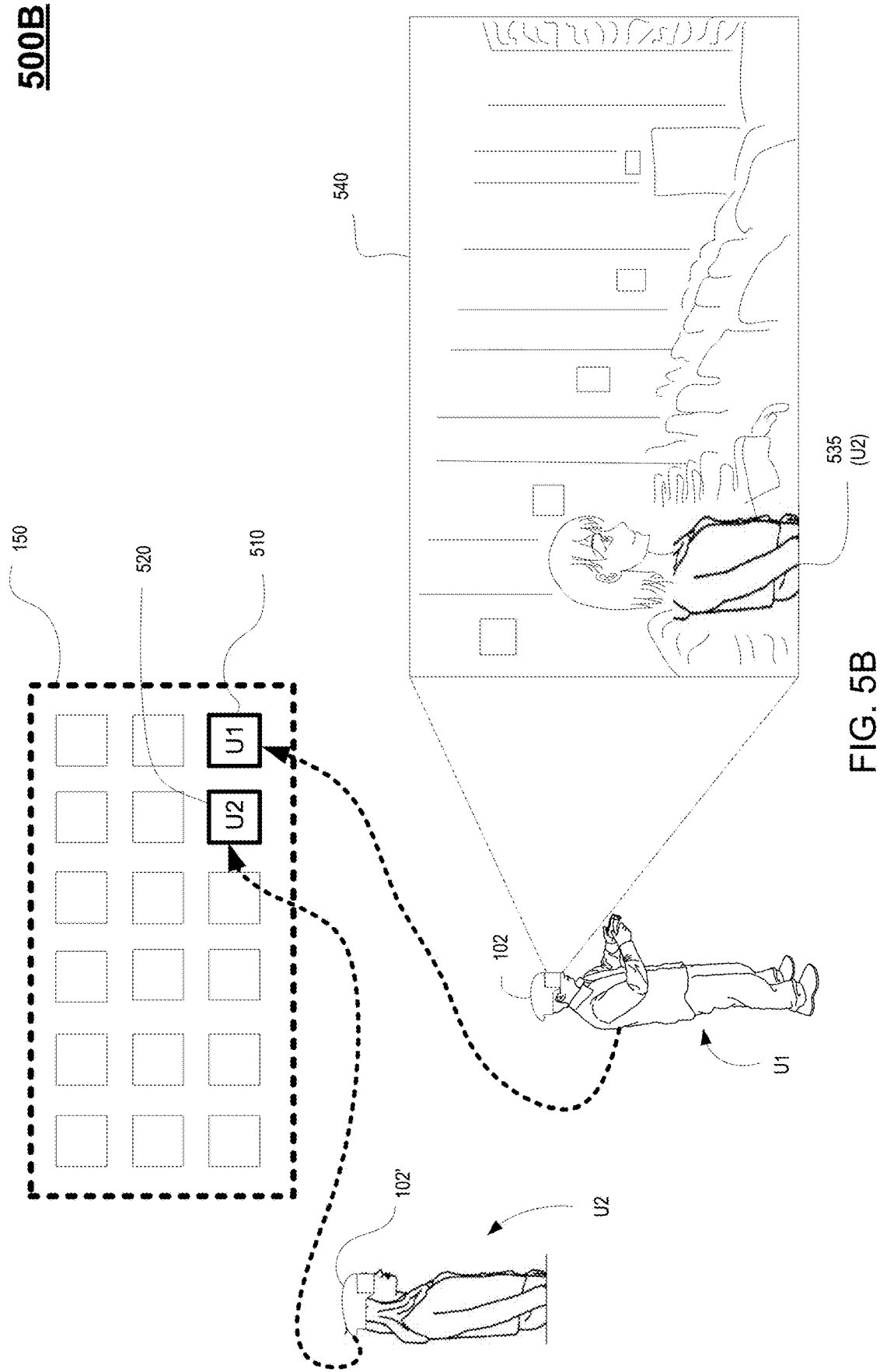
FIG. 5B illustrates a POV of a remote user U1 participating in the eSports live event (e.g., video gaming competition) and virtually seated at one of the physical seats in the eSports arena, wherein as the remote user looks to the left, the POV of the remote user U1 includes a view of a remote user spectator U2 participating in the live event as a virtual participant (i.e., remote user U2 is a virtual audience member), in accordance with one embodiment of the present disclosure.

FIG. 5B illustrates a POV of a remote user U1 participating in the eSports live event (e.g., video gaming competition) and virtually seated at one of the physical seats in the eSports arena, wherein as the remote user looks to the left, the POV of the remote user U1 includes a view of a remote user spectator U2 also participating in the live event as a virtual participant (i.e., remote user U2 is a virtual audience member), in accordance with one embodiment of the present disclosure.

In particular, the remote user U1 is able to participate in a live eSports event, such as from the comforts of a living room in the house of U1 through the HMD 102. As such, after selection of a seat 510 in the eSports arena, user U1 is presented with a POV of the live event as taken from the selected seat as viewed through an HMD 102. In that manner, user U1 is able to participate in the live eSports event, as if he or she were actually sitting in the eSports arena in the selected seat.

In addition, the remote user U2 is also able to participate in the live eSports event, such as through HMD 102'. For example, user U1 and user U2 may be friends over a social network, and have agreed to attend the live eSports event (e.g., as presented through the entertainment server 250 of FIG. 2) together. As such, the users U1 and U2 may cooperatively choose adjacent seats, such as seats 510 and 520, both in the VIP section 150 of eSports arena 100. As shown, user U1 is virtually sitting in seat 510 and user U2 is virtually sitting in seat 520. That is, user U2 is sitting to the left of user U1. As such, after selection of seat 520 by user U2, user U2 is presented with a POV of the live eSports event as taken from the selected seat as viewed through HMD 102'.

Both user U1 and user U2 are able to participate in the live eSports event, as if both were actually sitting in the eSports arena in their selected seats. FIG. 5B shows the interactive experience between the two remote users U1 and U2 when participating in the live eSports event. In particular, the POVs presented to both users U1 and U2 may be augmented reality views. That is, the augmented reality view may be generated in part from the live views collected from one or more data collection devices, and includes digital content that is inserted into the live view, wherein the live view may be generated by stitching together one or more live views collected from data collection devices. For example, the digital content may be an avatar representing either user U1 or U2.

In particular, FIG. 5B shows that user U1 has selected seat 510 in the VIP section 150 of eSports arena 100. The seat 520 to the left of seat 520 is occupied by remote user U2 (e.g., a friend of user U1). That is, seat 520 is occupied by a virtual participant—remote user U2. FIG. 5B shows the immersive experience of user U1, as the POV 540 shown in HMD 102 represents a view as the user U1 looks to the left in the eSports arena 100. As previously described, user U1 is virtually transported into the eSports arena 100 and should have an experience not unlike as if user U1 was actually sitting in seat 510—with some augmentation. For instance, the avatar 535 representing remote user U2 could be inserted into the POV 540 to show avatar 535 seated in seat 520. This augmented reality effect may be digitally inserted even though a live participant (LP) may actually be sitting in seat 520 (which in that case the LP would be filtered out of the POV 540). As such, POV 540 that is shown in HMD 102 would include a view of the avatar 535 that is virtually seated in seat 520.

Similarly, a POV generated for remote user U2 as displayed in HMD 102' would represent a view as the user U2 looks around the eSports arena 100. User U2 is also virtually transported into the eSports arena 100 and should have an experience not unlike as if user U2 was actually sitting in seat 520—with some augmentation. For instance, the avatar representing remote user U1 could be inserted into the POV to show that avatar seated in seat 510. That is, if the remote user U2 would look to the right, the POV would include a view of the avatar representing user U1 that is virtually seated in seat 510.

Figure 6:
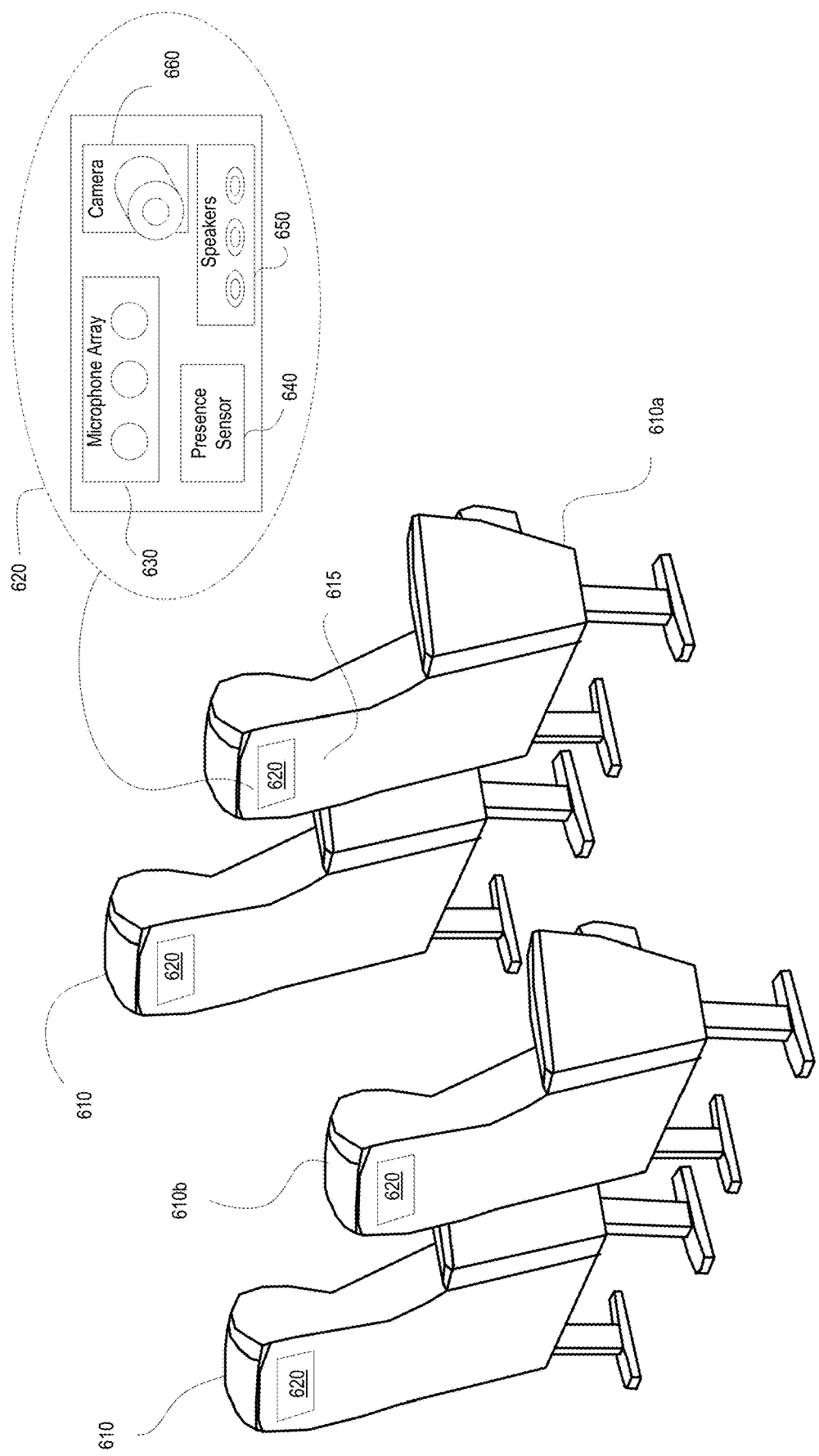
FIG. 6 illustrates a personal seat pack located on an arena seat, the personal equipment board configured to collect data related to an associated live participant that is viewing an eSports event in person, in accordance with one embodiment of the present disclosure.

FIG. 6 illustrates a personal seat pack 620 located on an arena seat 610, the personal equipment board configured to collect data related to an associated live participant that is viewing an eSports event in person, in accordance with one embodiment of the present disclosure. A plurality of arena seats 610 may be arranged in an eSports arena 100. For example, the arena seats may be arranged in rows, with one row located in front of or behind another row. In that manner, a seat in first row may be located in front of at least one seat in a second row that is behind the first row.

A seat pack 620 may be located on one or more arena seats 610. The seat pack may be located in such a way to collect data from one or more live participants. As shown, the seat pack is located on the rear of the top portion of the seat back 615 of an arena seat, and is configured to collect data from the live participant that is seated in a row behind that seat pack. For instance, seat 610a includes a seat pack 620 on the rear of the seat back 615. The seat pack 620 in seat 610a is positioned to collect from and/or provide data to a live participant located in seat 610b located in a row behind seat 610a.

Seat pack 620 includes one or more data collection devices that are configured to collect data from at least one live participant. For example, seat pack 620 located on seat 610a is configured to collect data from a live participant sitting in arena seat 610b. For example, the seat pack may include a camera 660 configured to collect images and/or video data. In that manner, the actions and face of the live participant may be collected. In one exemplary use case, the images and/or video data is used to build a live view of the eSports event to remote users. The seat pack may include a presence sensor 640 configured to determine whether a live participant is present. For instance, presence sensor 640 located in seat pack 620 on seat 610a may be configured to determine whether a live participant is sitting in seat 610b. The presence sensor 640 may implement any suitable sensing technique, such as infrared detection, sonar detection, sonic wave detection, ultrasonic wave detection, magnetic wave detection, vision detection, etc. Further, seat pack 620 may include a microphone array 630 that is configured to collect audio data, such as sounds produced by the live participant sitting in arena seat 610a. The array 630 may include multiple audio collection devices configured in a pattern suitable for beam steering and beam forming capabilities. For example, the array 630 in the seat pack located on arena seat 610a is able to determine sounds emanating from the live participant located in arena seat 610b, and filter those sounds from other sounds in the near environment. That is, the array 630 is able to pick up the sounds from the live participant located in arena seat 610b. Additional sensors may be included in seat pack 620.

Seat pack 620 may be configured to include one or more data provision devices. For example, the live participant sitting in arena seat 610b is positioned to receive data from the seat pack located on the rear of the arena seat 610a. For purposes of illustration, data provision devices may include a monitor, speakers 650, vibration devices, odor producing devices, etc. In particular, speakers 650 may be configured to provide audio to the live participant sitting in arena seat 610b, or to any participants in the immediate vicinity. For example, speakers 650 located in the seat pack on arena seat 610a may be associated with the sounds produced from a remote user who is virtually participating in the eSports event. The sounds (e.g., voice) from the remote user may be directed to a particular live participant seated in one of the seats located near seat 610a, including the live participant seated in seat 610a. As such, through speakers 650 the remote user may speak to one or more live participants in general, or may speak to a specific live participant, including the live participant sitting in seat 610*a*.

In one implementation, the sensors and devices in seat pack 620 could be configured in a seat pack that is removable from the arena seat 610. In still another implementation, the sensors and devices may be configured in a seat attachment that is removable from the arena seat 610. For example, the seat attachment may be a cover that surrounds at least the front of the seat 610. As an illustration, presence sensors may be located on the portion of the seat attachment adjacent to the seat cushion, such as a pressure sensor, and may detect the presence of the live participant sitting in the respective seat 610.

Figure 7A:
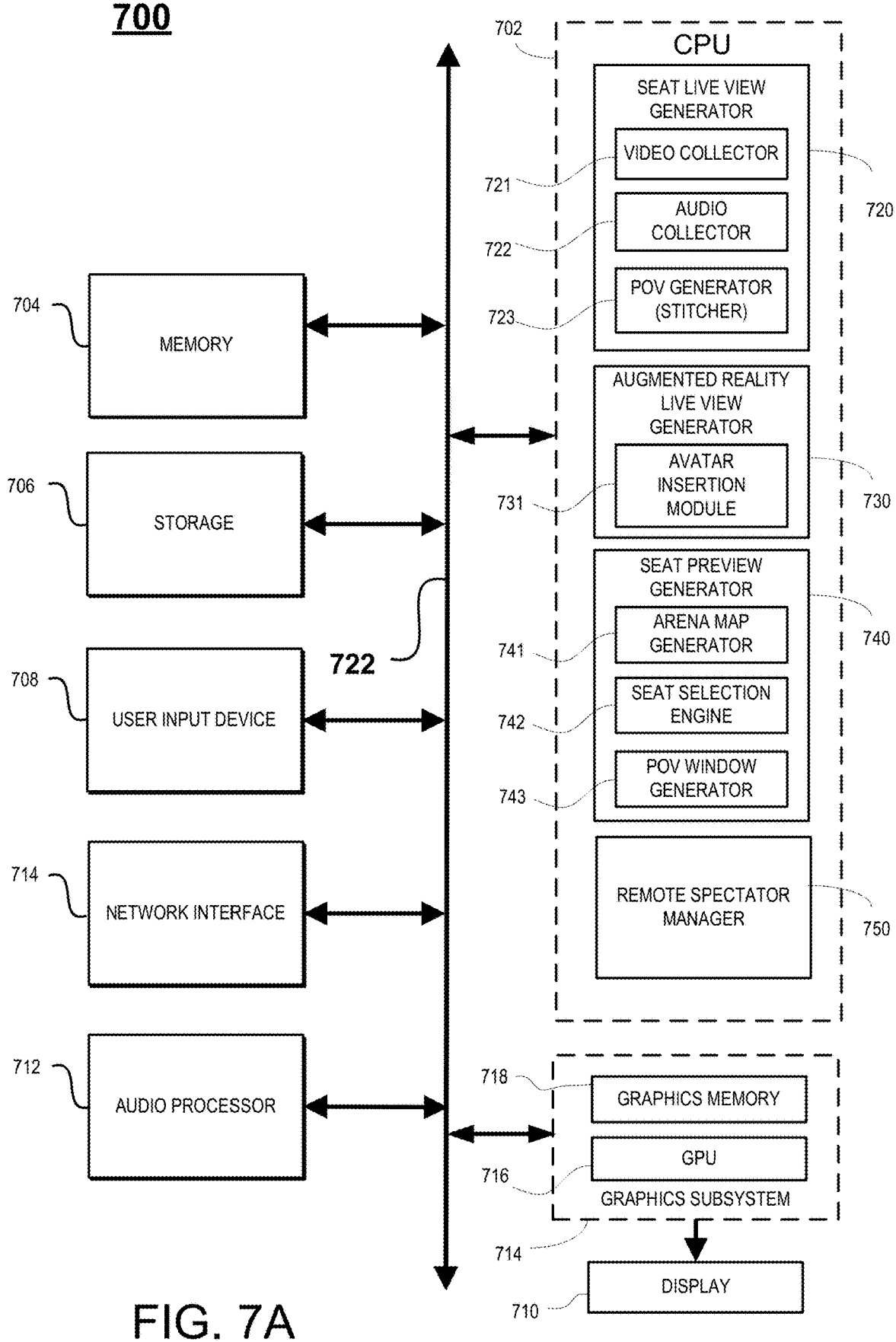
FIG. 7A illustrates components of an example device that can be used to perform aspects of the various embodiments of the present disclosure.

FIG. 7A illustrates components of an example device 700 that can be used to perform aspects of the various embodiments of the present disclosure. For example, FIG. 7A illustrates an exemplary hardware system suitable for implementing a device that provides services in support of a user participating in a live eSports event, in accordance with one embodiment of the present disclosure. This block diagram illustrates a device 700 that can incorporate or can be a server computer, personal computer, video game console, personal digital assistant, or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, device 700 could be a client side device that is supporting a back-end server, both of which are configured to support a user participating in a live eSports event. In another example, device 700 could be a server side device that is configured to support a user participating in a live eSports event via a client side device (e.g., gaming console).

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for supporting participation in live eSports events by remote users, etc.

In particular, CPU 702 includes a seat live view generator 720 that is configured to generate views of a live event, such as an eSports event. The live views are generated for one or more locations in an arena (e.g., eSports arena) based on one or more live recordings (e.g., video, audio) collected of the live event. For example, the live recordings may be performed by a video collector 721 configured to collect images and/or video of the live event, and an audio collector 722 configured to collect audio from the environment of the arena. A POV generator 723 is configured to generate the live views for a particular location in the arena, such as a specific seat in the arena. For example, POV generator may implement a stitching technique that is configured to stitch together one or more videos of the live event taken from predefined locations in the arena to generate a live view of the event from a specific location in the arena. As such, even though a live recording may not have been collected from the specific location, a live view may be generated for that specific location based on one more live recordings of the live event. CPU 702 also includes an augmented reality live view generator 730 that is configured to present an augmented reality view for the live view generated for a specific location in the arena (e.g., by generator 720). For example, digital content may be inserted into the live view generated for that specific location. In particular, avatar insertion module 731 is configured to insert an avatar into the live view. The avatar may represent a second remote user that is participating in the live event, and is seated nearby. That is, the user corresponding to the view generated by the seat live view generator 720 and augmented reality live view generator 730 may be a first remote user that is participating in the live event, and further may be virtually seated next to or near the seat occupied by the second remote user. As such, the augmented reality view of the first remote user includes an avatar for the second remote user. Other digital content may also be inserted. CPU 702 also includes a seat preview generator 740 that is configured to generate a preview of a view of the live event that corresponds to a particular location in the arena (e.g., eSports arena 100). For example, arena map generator 741 is configured to generate a floor plan of the arena, to include a seating chart, wherein the floor plan can be used for selection of locations (e.g., seats) within the arena for which a preview is described. In particular, seat selection engine 742 is configured to generate and manage an interface that allows a user to select a location (e.g., seat) within the arena, via the floor plan. In addition, provided in the interface, the POV window generator 743 is configured to generate a preview that may include a view of the live event (e.g., eSports event) that is generated from the standpoint of the selected location (e.g., seat).

CPU 702 may also provide additional functionality related to presentation of a live event to a remote user. For example, the live event may be an eSports event that is being broadcast to remote users who wish to virtually participate in the live eSports event as a virtual audience member. In particular, the remote spectator manager 750 is configured to provide a remote user a virtual experience of a live event, such as an eSports event. A more detailed description of the remote spectator manager 750 is provided in FIG. 7B.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702.

Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

It should be understood that the embodiments described herein may be executed on any type of client device. In some embodiments, the client device is a head mounted display (HMD), or projection system.

Figure 7B:
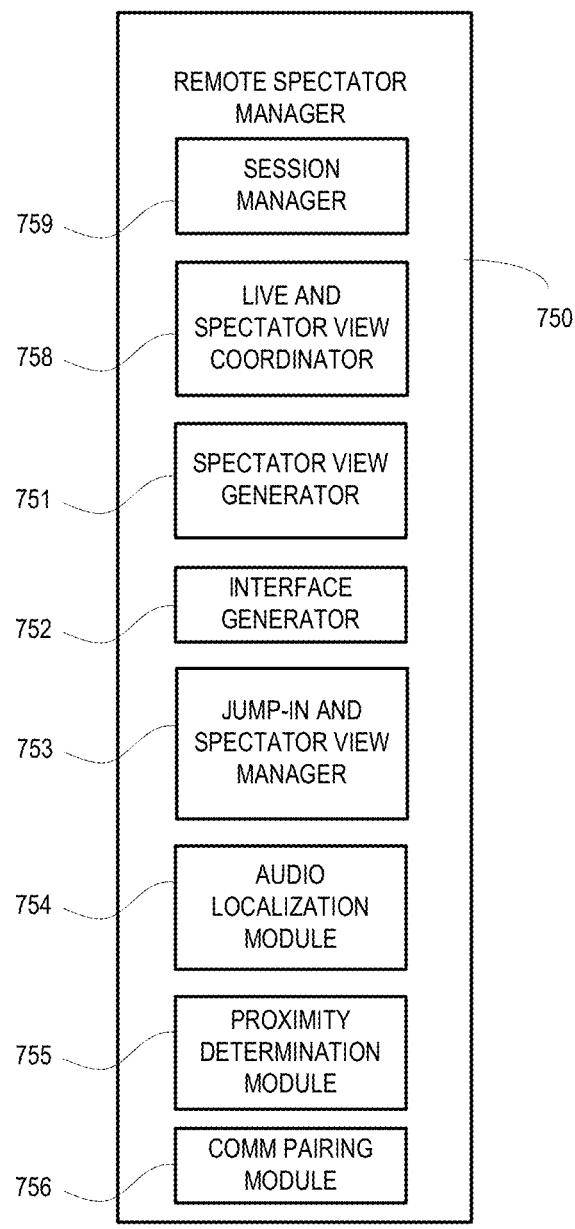
FIG. 7B illustrates components of a remote spectator manager 750 introduced in FIG. 7A, wherein the generator 750 is configured to provide a remote user a virtual experience of a live event, in accordance with one embodiment of the present disclosure.

FIG. 7B illustrates components of a remote spectator manager 750 introduced in FIG. 7A, wherein the generator 750 is configured to provide a remote user a virtual experience of a live event, in accordance with one embodiment of the present disclosure. In particular, the spectator view generator 750 includes a spectator and main view generator 751 that is configured to generate a main view into a gaming world of a multi-player gaming application being played by one or more users. For example, a multi-player gaming session of the gaming application may be performed live by one or more gaming competitors at a live eSports event. The gaming session may be established and managed by any of the components of CPU 702, the cloud gaming provider 112 of FIG. 2, or any combination thereof. The main view corresponds to a view into the gaming world of the gaming application in association with the game plays of the one or more users. The main view corresponds to a point-of-view (POV) within the gaming world. For instance, the main view may be generated from the POV of one of the characters being controlled by one of the users. In another embodiment, the main view may be a live view of an eSports arena showcasing an eSports event centered around game plays of multiple players playing a gaming application. The main view may be provided for display to a remote user. In addition, one or more spectator views into the gaming world may be generated. The spectator views are taken from different POVs within the gaming world. That is, while the game plays of the one or more users are being generated through execution of the gaming application as controlled by the one or more users, the spectator views can also be generated. For example, the cloud gaming provider 112 and/or the back-end entertainment server 250 may generate the spectator views in association with execution of the gaming application to generate the one or more game plays. The spectator views may correspond to one or more pre-designated locations within the gaming world. In addition, a spectator view may correspond to a selected location within the gaming world, as selected by the remote user. In that manner, the remote user can choose various viewpoints inside the gaming world from which to view the live action being generated by the game plays of the one or more users. For example, the user may want to gain a different perspective on the action within the gaming world, as obtained from one of the spectator views.

A gaming session may be established and managed by a game session manager 759 in association with one or more game plays of one or more users playing a gaming application (e.g., professional gamers participating in an eSports event featuring simultaneous game plays of a multi-player gaming application). Session manager 285 is configured to access and/or manage game state for the game session. Session manager may execute the game code of the gaming application, or may instruct a game execution engine to execute the game code. Game session manager 759 and/or game execution engine may be located at the cloud gaming provider 112 of FIG. 2. In particular, game session manager 759 may communicate with the game execution engine to deliver and obtain user input commands that are used to influence the outcome of a corresponding game play. Input commands may be transmitted from user device to game session manager 759, and are used to drive game play. Because game plays are executed and managed by the game session manager 759, information generated and stored from those game plays enable any requesting user to experience the game play of other users. For example, spectator views into the gaming world of the game plays may be generated by the spectator view generator 751 based on the information generated for the game session.

The remote spectator manager 750 includes an interface generator 752 that is configured to generate an interface displaying at least one of the main and spectator views. In one embodiment, the interface is configured to display the main view, and also display one or more spectator views for selection by a remote user. In addition, the spectator view selector 753 is configured to manage the selection of a spectator view through the interface. As such, when a spectator view is selected and recognized as being selected, that view may be prominently displayed to the remote user within the interface.

The remote spectator manager also includes a live and spectator view coordinator 758 configured to manage the delivery of a data to the remote user. In particular, the coordinator 758 manages deliveries of the view of the real-word venue and/or the spectator view of the interactive gaming world to the HMD of the remote user. As such, the remote user may be viewing the real-world venue to gain an augmented reality experience at one time, and may be viewing the interactive gaming world in a spectator view to gain a virtual reality experience at another time.

The remote spectator manager 750 includes an audio localization module 754 that is configured to generate audio associated with the game plays being performed within the gaming world as executed by the gaming application. In particular, a unique audio signal may be generated for each of the main and spectator views, wherein each audio signal is generated based on the location from which the corresponding view was generated. For example, the main view is generated from a particular POV, and the audio from all the game plays are reflected within the audio being generated for the main view at that POV. Similarly, audio for each of the spectator views may be localized for their respective POVs. For example, the cloud gaming provider 112 and/or the back-end entertainment server 250 may generate the audio from the game plays, and the localization module 754 is able to modify that audio through localization specific to a particular location within the gaming world.

The remote spectator manager 750 includes a proximity determination module 755 that is configured to track movement of spectator avatars located within the gaming world. For example, one or more remote users may be actively spectating the game plays from one or more POVs. Each POV may correspond to a spectator avatar that is placed within the gaming world, and that can be visible to other remote users that are participating in the live event through spectator views. The spectator avatars may be controllable to move within the gaming world. As such, the proximity determination module 755 is able to determine when two spectator avatars are within close proximity within the gaming world. For example, the two spectator avatars may be close enough to hold a conversation. As such, the communication pairing module 756 is configured to create a communication channel between devices associated with the remote users controlling the spectator avatars. For instance, the devices may be head mounted displays (HMDs). In that manner, the remote users may hold a conversation that is independent of the audio being generated from the game plays of the one or more users playing the multi-player gaming application.

Figure 8:
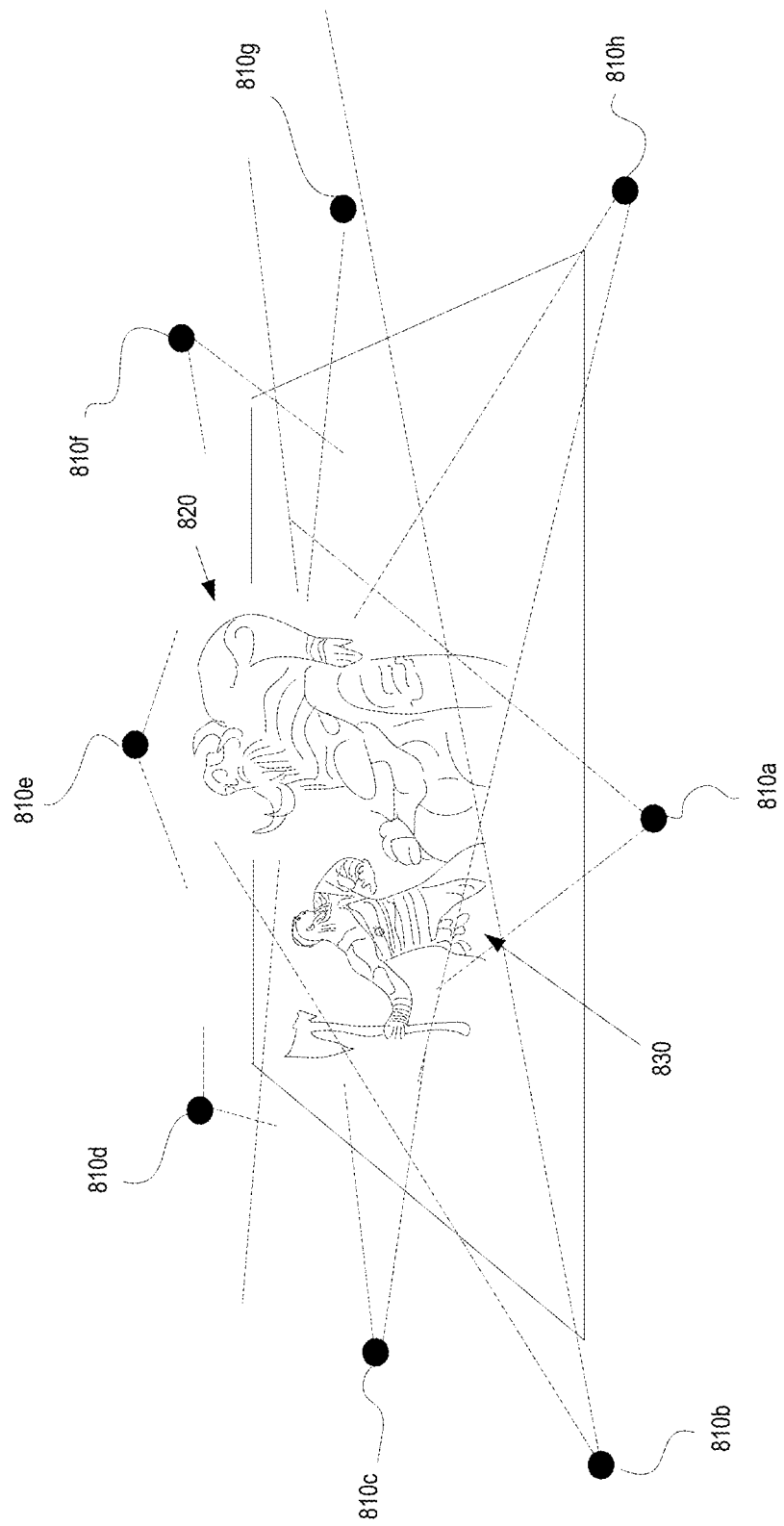
FIG. 8 is an illustration of a gaming world within which a battle between Kratos, the son of Zeus and an enemy combatant is being generated within one or more game plays of the God of War gaming application, published by SONY Computer Entertainment, in accordance with one embodiment of the present disclosure.

FIG. 8 is an illustration of an interactive gaming world 800, including one or more spectator views into the gaming world, in accordance with one embodiment of the present disclosure. Player participation is enabled (e.g., through game plays) in the interactive gaming world. Gaming world 800 is exemplary, and for illustration purposes only shows a battle scene between Kratos, the son of Zeus and an enemy combatant, wherein the battle scene is being generated within one or more game plays of the God of War gaming application, published by SONY Computer Entertainment, in accordance with one embodiment of the present disclosure. In particular, the gaming world 800 may be generated through one or more game plays of one or more users. For example, the game plays may be generated in association with one or more professional gamers playing the gaming application at a live eSports event. As previously described, the game plays may be displayed within an eSports arena for audience viewing and enjoyment.

Purely for illustration purposes only, gaming world 800 may include a battle between Kratos 830 and the enemy combatant 820. In the God of War gaming application, Kratos is a Spartan warrior of Greek mythology, who is tasked with killing Ares, the God of War. In the gaming world, a player may control Kratos. Though gaming world 800 as shown in FIG. 8 may only include one battle in association with a game play of God of War, other gaming worlds may include multiple game plays as controlled by multiple players.

Multiple views into the gaming world 800 may be generated. For example, the cloud gaming provider 112, the entertainment server 250, or a gaming console may generate the multiple views in association with the generation of the one or more game plays. In another embodiment, the spectator view generator 751 of the remote player manager 750 is configured to generate the views independently or in combination with the cloud gaming provider 112, the entertainment server 250, the real-world venue server 235, and/or a gaming console. In particular, a first spectator view of the gaming world 800 may be generated from a first location. For example, POV 810a may correspond to the first spectator view, and may be described as a frontal view of the battle between Kratos 830 and the enemy 820. The first spectator view may be associated with a POV of a character, such as Kratos 830. That is, the first spectator view may be taken from the standpoint of the view of Kratos 830. In one embodiment, the first spectator view may be projected onto the display of the HMD of the remote user as primary content. The first spectator view is in contrast to the live view of a real world-venue holding a live event, such as a view into an eSports arena showcasing the game plays of multiple professional gamers playing a gaming application. The HMD may be selectable to display the live, hybrid, augmented reality view of the real-world venue, or one of the spectator views.

Additional spectator views of the interactive gaming world may also be generated. These spectator views into the gaming world are views into the game plays being generated through execution of the gaming application as controlled by one or more users (e.g., professional gamers). As shown, the spectator views are generated from the standpoint of one or more POVs (e.g., POVs 810a, 810b, 810c, 810d, 810e, 810f, 810g, and 810h). That is, the spectator views may be any view into the interactive gaming world. These POV locations may be predesignated, or selectable by a remote user. The various locations may surround the battle being generated within the gaming world. For instance, POV 810c is taken from the back of Kratos 830, POV 810f is being taken from the back of the enemy 820, POV 810h is taken from the side of the battle. In that manner, multiple different spectator views may be presented for viewing by the remote users.

Further at each location, a corresponding view may be taken from any number of points along a vertical line extending upwards from that location. For instance, the view may be taken near the ground, so that the view is looking upwards at the battle. The view may also be taken near eye level of an ordinary human (or character within the gaming application), to provide a customary view into the gaming world, and of the battle between Kratos 830 and enemy 820. Further still, the view may be taken up high to give an aerial view downwards onto the battle between Kratos 830 and enemy 820.

Figure 9:
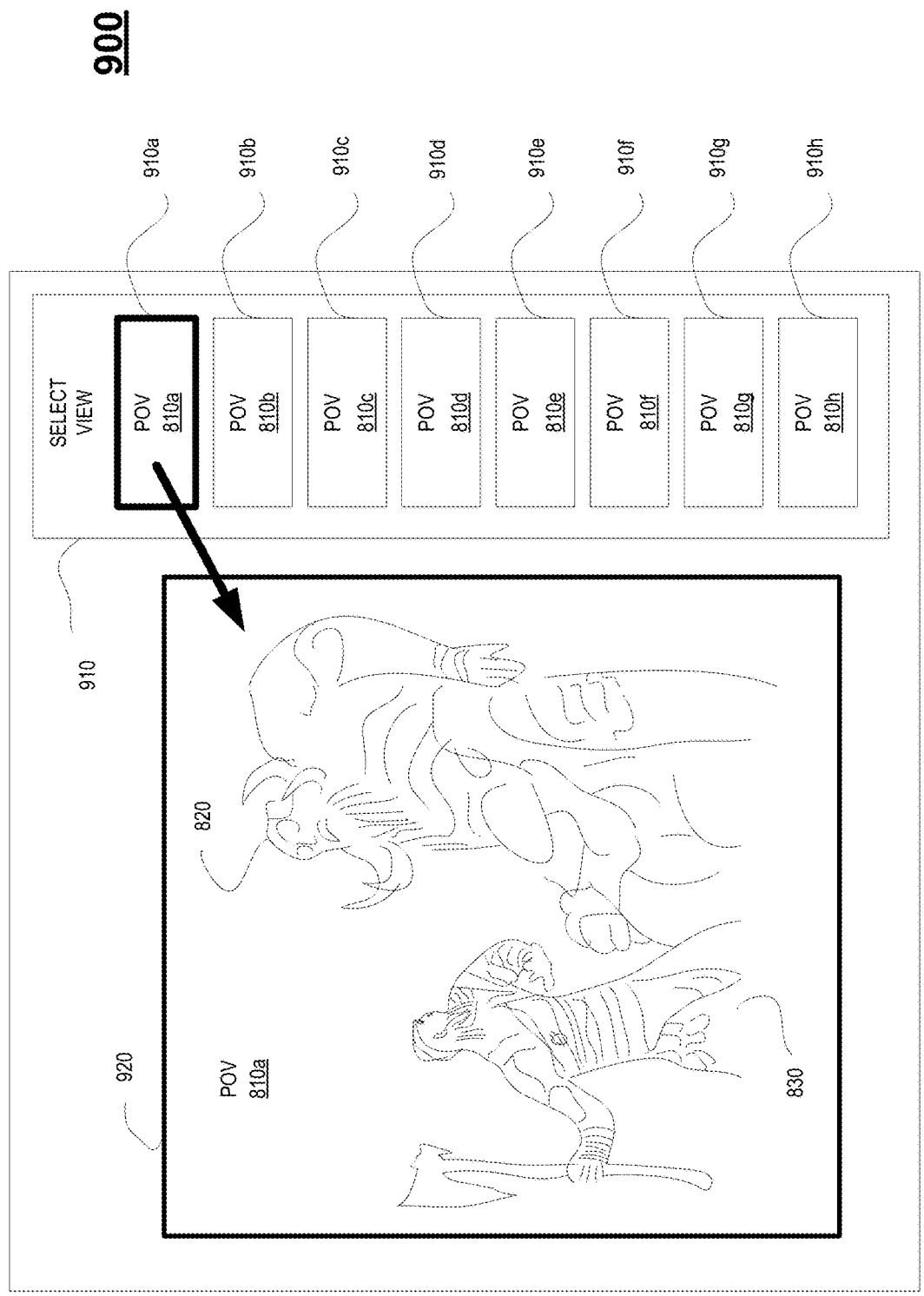
FIG. 9 is an illustration of an interface for interaction by a remote user, wherein the interface includes windows of one or more spectating views into a gaming world that are selectable a remote user, in accordance with one embodiment of the present disclosure.

FIG. 9 is an illustration of an interface 900 for interaction by a remote user, wherein the interface includes windows of one or more spectating views into a gaming world that are selectable by the remote user, in accordance with one embodiment of the present disclosure. In particular, interface may be generated by the interface generator 750, previously described, and delivered to a remote user for interaction. For example, the interface may be delivered to an HMD being worn by the remote user. In that manner, the interface may be inserted into the man content being displayed within the HMD, wherein the main content may be the live, hybrid, and/or the augmented reality view of a real-world venue holding a live event (e.g., eSports event). In one implementation, the interface may be super-imposed onto the main content. In another implementation, the interface may be the main content being prominently displayed in the HMD.

Interface 900 includes a window 920 that displays a selected view of the gaming world that is associated with the game plays being generated through execution of a corresponding gaming application, as controlled by one or more users (e.g., professional gamers participating in an eSports event). The selected view may be taken from POV 810a of the gaming world, as previously described in FIG. 8. Specifically, the selected view includes a frontal view of the battle between Kratos 830 and the enemy 820. The window 920 may display any of the spectator views described previously (e.g., one of POVs 810b-810h). Selection of the view of interest to the viewer is described below.

In particular, interface 900 includes a selection window 910 that is configured for interaction with the remote user. That is, selection window 910 includes one or more preview windows (e.g., 910a, 910b, 910c, 910d, 910e, 910f, 910g, and 910*h*). Each of the preview windows includes one of the spectator views into the gaming world 800, such as the spectator views previously described in FIG. 8. For example, window 910*a* includes a spectator view taken from the POV 810*a*, the window 910*b* includes a spectator view taken from the POV 810*b*, window 910*c* includes a spectator view taken from the POV 810*c*, window 910*d* includes a spectator view taken from the POV 810*d*, window 910*e* includes a spectator view taken from the POV 810*e*, window 910*f* includes a spectator view taken from the POV 810*f*, window 910*g* includes a spectator view taken from the POV 810*g*, and window 910*h* includes a spectator view taken from the POV 810*h*. Preview window 920 may include one or more preview windows.

The scene in a corresponding preview window may be a static image that is periodically updated, in one embodiment. In another embodiment, the scene in a corresponding preview window is live (e.g., as being generated within the game plays of the gaming application), or updated so frequently that it is seemingly live (e.g., up to the second updates). In another embodiment, the updating period may be slower than real-time (e.g., every 1, 5, 10, 20, etc. seconds). The resolution of the images presented in the preview window may be of lower resolution, or of equal resolution as being generated for the main window 920.

As shown in FIG. 9, preview window 910*a* is selected by the viewer. As such, spectator view 810*a* is displayed in the main window 920 for viewing in the interface 900. Selection of a preview window may be implemented through any number of methods. For instance, hand recognition controls may be implemented, or through controller manipulation. For example, a controller method may be implemented, wherein one button can be used for scrolling through the preview windows, and a second button can be used for selecting a particular preview window. Once a preview window is selected, the corresponding spectator view may be displayed within the large window 920. A third button can be used for deselection, wherein multiple actuations of the third button may return the view in the large window back to the main view corresponding to POV 810*a*. Still other implementations include a pointer that may be moved and/or selected through clicking or object movements (e.g., eye, hand, etc.).

The interface is removed from the display of the HMD upon a trigger event, whereupon the HMD again prominently displays the main content. The trigger event may be a sequence of multiple back buttons that are engaged to return to the main content (e.g., the live, hybrid, and/or augmented reality view of the real-world venue). The trigger event may be any other signal (e.g., hand movement) that indicates a return to the main content. The trigger event may be an event within the real-world venue. For example, a main display within the real-world venue may be showing a view into the interactive gaming world, and broadcast announcers may be performing play-by-play of the game plays being shown in the main display. When there is a switch between game plays when a spectator view is being shown in the HMD (e.g., through the interface, or as main content), the display in the HMD may return back to the view into the real-world venue for audience and broadcaster consistency.

Figure 10:
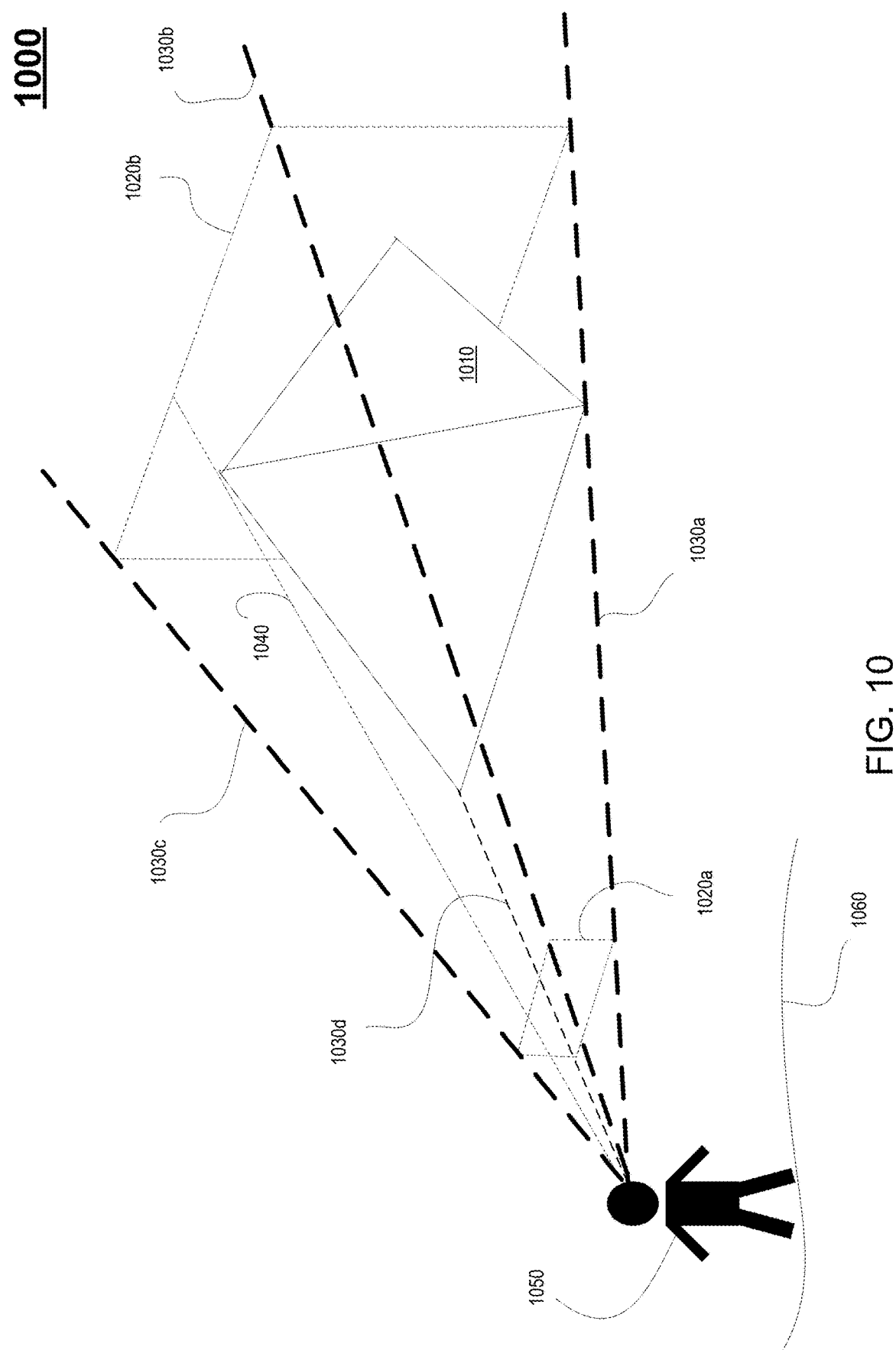
FIG. 10 is an illustration of the scaling of a spectator point of view being generated for a given location within a gaming world, in accordance with one embodiment of the present disclosure.

FIG. 10 is an illustration of the scaling of a spectator point of view being generated for a given location within a gaming world 1000, in accordance with one embodiment of the present disclosure. As previously described, the gaming world is generated in association with the game plays being executed for a gaming application as controlled by one or more users. For example, the gaming world may be generated in association with a live eSports event, wherein a gaming application is being played by one or more professional gamers.

As shown in FIG. 10, the gaming world 1000 includes a pyramid 1010. For example, the gaming application may provide a three dimensional (3D) view into one or more physical or virtual locations within the world. The 3D view may be generated as real views or virtual views. In addition, the gaming world 1000 may be completely fictitious, as generated by the gaming application.

In one embodiment, one or more spectator views may be generated for the gaming world 1000. These spectator views may be generated from the standpoint of corresponding spectator avatars. For example, a spectator view may be generated for avatar 1050. The spectator view is bounded by lines 1030*a*, 1030*b*, 1030*c*, and 1030*d*. The spectator view may be further defined by viewing boxes located at different distances from the location of the avatar 1050. For instance, the near viewing box 1020*a* and the far viewing box 1020*b* are each defined by boundary lines 1030*a*-1030*d*. In particular, the viewing boxes 1020*a* and 1020*b* may define a spectator view into the gaming world for a particular orientation of the avatar 1050. As an example, the spectator view may be one of the views 810*b*-810*h* of FIG. 8.

As shown, the spectator view defined by boundary lines 1030*a*-1030*d* includes a view of a pyramid 1010. For example, the avatar 1050 may be located at a far distance (e.g., 1 to 2 miles from pyramid 1010), wherein the spectator view defined by boundary lines 1030*a*-1030*d* is a far away view of the pyramid 1010. The avatar 1050 is standing on ground 1060 (e.g., the sands of Egypt).

In particular, the spectator view is generated such that objects within the spectator view are scaled appropriately for a given size of the viewer (e.g., remote user). For example, the avatar may generate a spectator view that is generated for an appropriately sized human (e.g., child, adult, etc.). That is, the POV of the avatar is human sized. As such, the objects in the spectator view are scaled appropriately for that POV. As such, the objects would not be too small, or too large. Correspondingly, the size of the avatar 1050 associated with the POV for the spectator view would also not be too small or large, but would be appropriately sized for a human, for example. In that manner, the spectator view would be most familiar to the remote user, as the objects within the spectator view are appropriately sized. For instance, an application showing spectator views of a pyramids in Egypt would not be taken from a standpoint of a huge giant, or a small mouse, but rather a typical human.

In addition, the scaling of the objects in the spectator view would remain consistent as the avatar 1050 moves through the gaming world. As such, as the avatar 1050 moves through the gaming world 1000, the pyramid 1010 would remain appropriately scaled.

Figure 11:
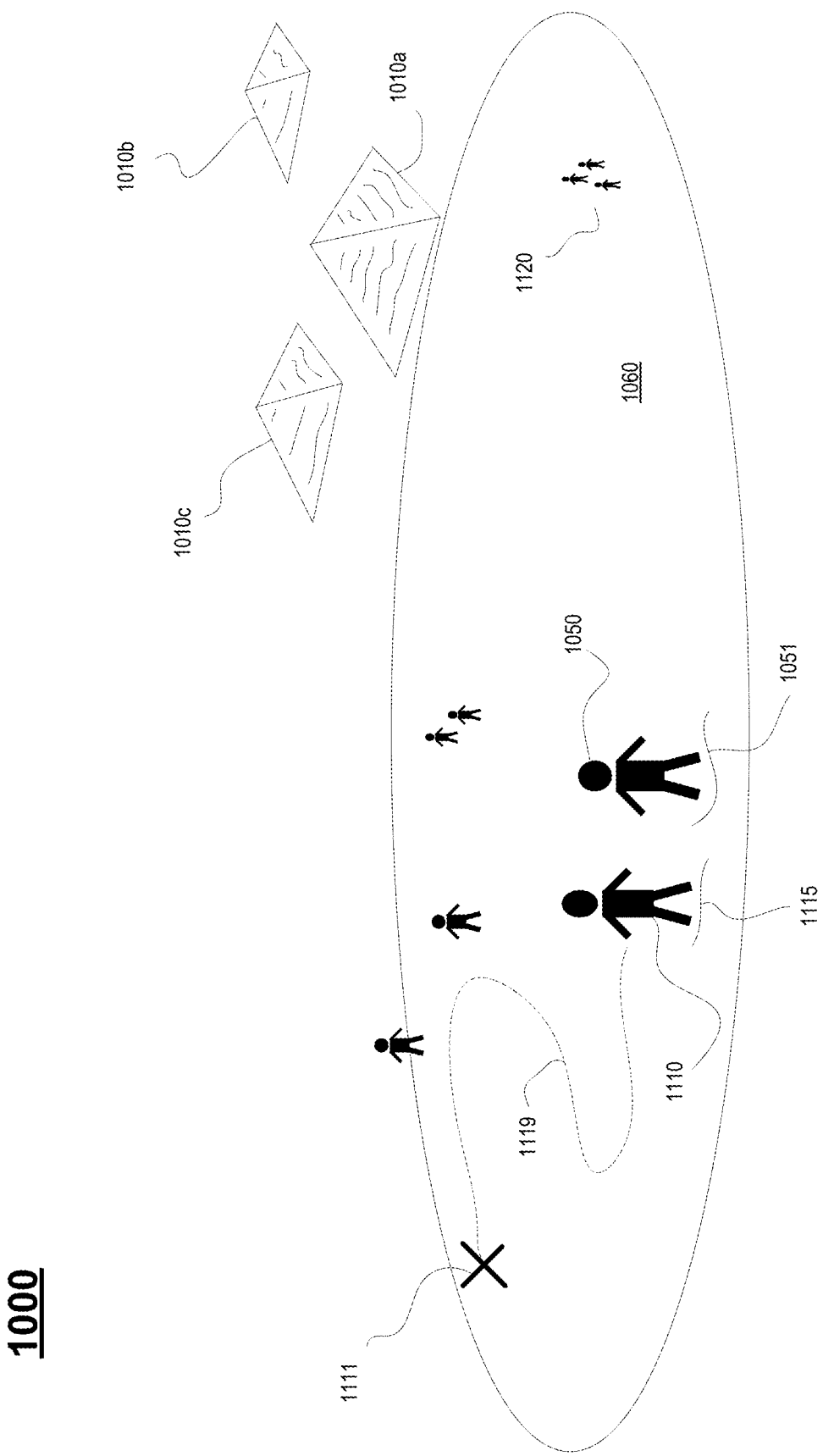
FIG. 11 is an illustration of the interaction between two spectator avatars within a gaming world, wherein a communication channel is established between two remote users when their corresponding spectator avatars are in close proximity, in accordance with one embodiment of the present disclosure.

FIG. 11 is an illustration of the interaction between two spectator avatars within a gaming world 1000 first introduced in FIG. 10, wherein a communication channel is established between two remote users when their corresponding spectator avatars are in close proximity, in accordance with one embodiment of the present disclosure. For example, the gaming world 1000 may provide a 3D view into one or more physical or virtual locations within the world, wherein the 3D view may be generated as real views or virtual views. as shown, gaming world 1000 may include pyramids 1010*a*, 1010*b*, and 1010*c*.

In the gaming world 1010, ground 1060 is shown. Avatar 1050, previously introduced in FIG. 10, is also shown on ground 1060. For example, consistent with the view generated for spectator 1050 in FIG. 10, avatar 1050 may be located approximately 1-2 miles from the pyramids.

In addition, multiple spectator avatars are also located within the gaming world 1000. For example, the group of 5 avatars 1120 are located closer to the pyramids 1010a-1010c than avatar 1050. That is, the group 1120 may be within one-half of a mile from the pyramids. Other spectator avatars are also shown in gaming world 1000. One or more of the spectator avatars may be controlled by a corresponding remote user.

Spectator avatar 1110 is also shown in gaming world 1000. Avatar 1110 is controlled by another remote user (e.g., second remote user), that is separate from the remote user (e.g., first remote user) controlling spectator avatar 1050. In particular, the avatar 1050 is controlled by the first remote user, wherein the avatar 1050 is located at a particular location 1051 in the gaming world 1000. A spectator view is generated from the POV associated with avatar 1050 for the first remote user.

Similarly, avatar 1110 is controlled by the second remote user, wherein the avatar 1110 is located at another location in the gaming world 1000. The avatar 1110 first is located at point 1111 in the gaming world 1000, and is moved through control by the second user along path 1119 to location 1115 in the gaming world. A spectator view is generated from the POV associated with avatar 1110 at various locations along path 1119.

In one embodiment, the two remote users are able to interact with each other through the gaming world 1000. That is, the spectator views for each avatar 1110 and 1050 would each possibly include the other avatar. For example, the spectator view for avatar 1110 may include avatar 1050, and the spectator view for avatar 1050 may include avatar 1110. In particular, the proximity determination module 755 is configured to determine when the avatar 1110 is in proximity to the avatar 1050 (controlled by the first remote user). Because the spectator views are being generated from specific locations in the gaming world, those POV locations may be tracked. As such, when the two avatars 1050 and 1110 associated with two different spectator views are in close proximity, then the communication pairing module 756 may establish a communication channel to pair the first remote user and the second remote user in order to enable the exchange of communication. For instance, the back-end entertainment server 250 may be configured to establish the communication channel. In that manner, when avatar 1110 and avatar 1050 are in close proximity (e.g., a distance within which two humans may communicate comfortably), then the communication channel is established and enabled automatically. Just as in the real world, a verbal interaction between two persons may occur without any extensive arrangements.

In one embodiment, the spectator view is not intended to have any influence on the outcome of the game play as executed by the gaming application. However, in addition to interactions with other spectator participants, the remote user viewing the spectator view may interact with one of the users controlling a corresponding game play (e.g., professional gamer in an eSports event). For example, an eSports event may be a live golfing tournament, wherein professional gamers are playing a golf gaming application. Remote users may virtually participate in the eSports event through one or more spectator views that correspond to one or more avatars in a gaming world of the gaming application. In one implementation, as the spectator avatar for a corresponding remote user approaches a character controlled by a gaming professional, a pairing may be established through a paired communication channel, such that the two may communicate. For example, the remote user may give tips or hints as to the slope of the green to the gaming professional.

Figure 12:
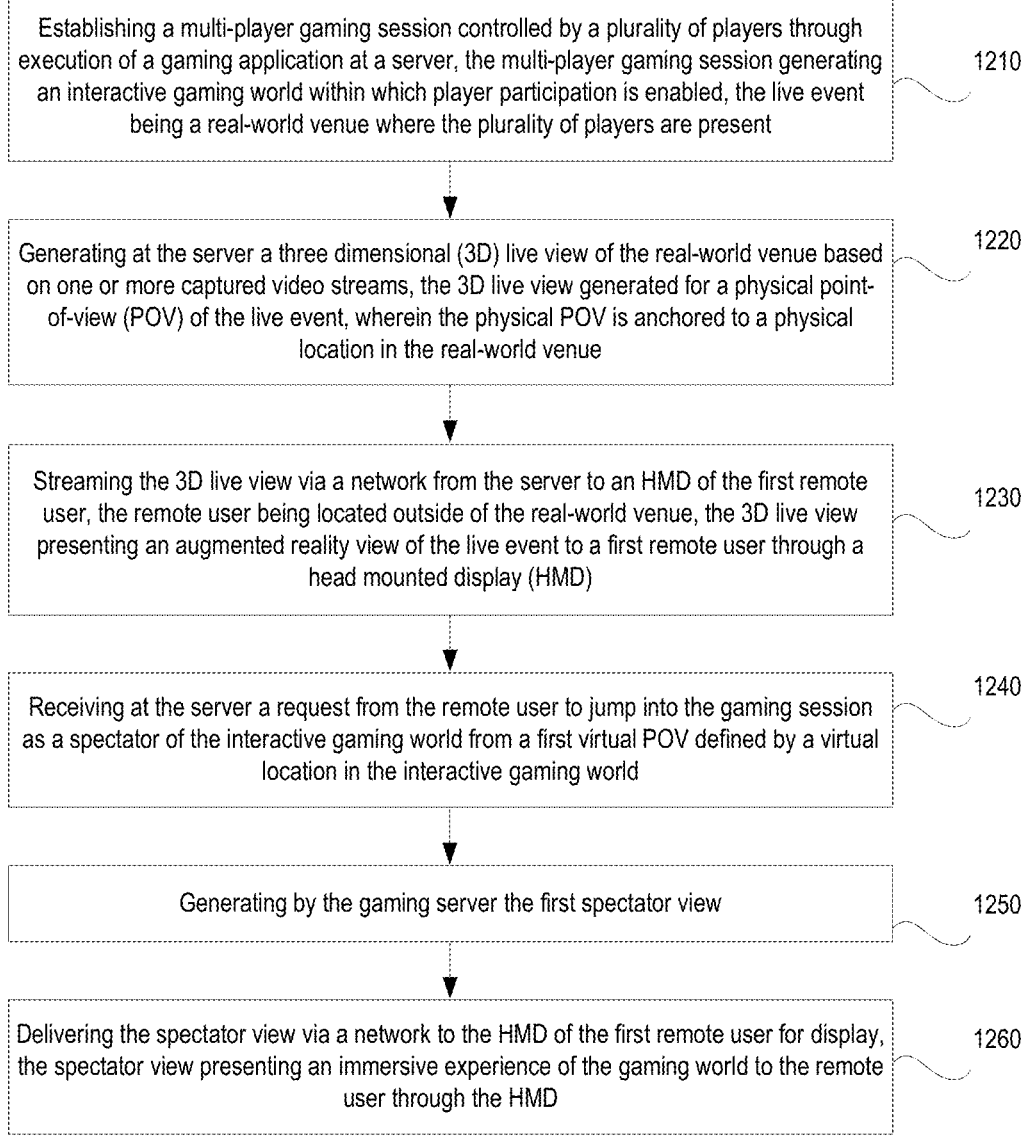
FIG. 12 is a flow diagram illustrating a method for spectating by a remote user of a live event (e.g., an eSports event), in accordance with one embodiment of the present disclosure.

With the detailed description of the various modules of the remote spectator manager configured to provide one or more views into a gaming world associated with one or more game plays of users playing a multi-player gaming application, a method for spectating is now described in relation to flow diagram 1200 of FIG. 12, in accordance with one embodiment of the present disclosure. The method outlined in flow diagram 1200 is implemented by one or more systems and/or components of FIGS. 2A-2B and FIG. 7A in embodiments.

For example, the gaming application may be executing to facilitate a multi-player gaming session through the execution of a gaming application in association with a live event (e.g., eSports event) held in a real-world venue, wherein one or more professional gamers may be playing the gaming application within the gaming session. A live audience is attending the live event in the real-world venue, and many more remote users can also participate in the live event as virtual attendees or participants, as previously described.

The method begins at operation 1210 and includes establishing a multi-player gaming session controlled by a plurality of players through execution of a gaming application at a server. That is, the players are playing the gaming application through the gaming session. The multi-player gaming session generates an interactive gaming world within which player participation is enabled. The live event being a real-world venue where the plurality of players are present. For example, the live event may be an eSports event held in an arena. In another example, the live event may be a sporting event held in an arena or stadium. Other live events are contemplated, such as theater shows, music concerts, etc. The gaming session may be created and managed at a server, such as a cloud based gaming server, or entertainment server configured for generating live, hybrid, and/or augmented reality views into the real-world venue showing the gaming session.

At 1220, the method includes generating at the server a three dimensional (3D) live view of the real-world venue based on one or more captured video streams. The 3D live view is generated for a physical point-of-view (POV) of the live event, wherein the physical POV is anchored to a physical location in the real-world venue. In particular, the captured video streams are captured from one or more video capture devices within the real-world venue. Based on one or more of the captured video streams, live, hybrid, and/or augmented reality views of the real-world venue may also be generated. That is, for every location in the real-world venue, a view into the venue may be generated using a subset of the video streams being captured. As such, a first subset of video streams may be used to generate a first view into the venue from a first seat, and a second subset of video streams may be used to generate a second view into the venue from a second seat. The views may be live, hybrid, and/or augmented reality views into the real-world venue. For example, for the first view the views may be generated by stitching the video frames from the first subset of captured video streams.

Similarly, the live, hybrid and/or augmented reality views into the real-world venue can be accented with localized audio. That is, audio is generated using unique subsets of captured audio streams for each location in the venue.

At 1230, the method includes streaming the 3D live view via a network from the server to an HMD of a first remote user. The first remote user is located outside of the real-world venue, such as within the living room of a home of the user. The user may even be located in a different block, city, county, state, and/or country. That is, the first remote user is not physically attending the live event at the real-world venue, but may through embodiments of the present invention virtually attend the live event through live, hybrid, and/or augmented realty views into the real-world venue. Specifically, the 3D live view presents an augmented reality view of the live event to the first remote user through a head mounted display (HMD). As previously described, the live view is generated for a specific location in a real-world venue holding the live event, and is based on one or more video and audio recordings collected from one or more locations in the venue.

In one embodiment, the method includes generating audio for the 3D live view that is localized for the physical POV in the real-world venue. In general, sounds are being generated from all over the real-world venue. As such, audio being collected or experienced at a particular physical location within the real-world venue would sound different than the audio being experienced at another location. For example, a first location that is close to the stage of the venue and a large cluster of stage speakers would sound different than a location that is remote from the stage. As such, the audio being generated for the live view is localized for the physical POV (i.e., based on the location of the physical POV within the real-world venue). That is, far away sounds would be diminished, and nearer sounds within the venue would be amplified for the physical POV. Further, the live view is aligned with the audio that is localized. In that manner, the first remote user viewing the live view can participate in the gaming world in an augmented reality space.

At 1240, the method includes receiving at the server a request from the first remote user (e.g., from a device related to the user) to jump into the gaming session as a spectator of the interactive gaming world. The first remote user would be spectating into the interactive gaming world from a first virtual POV defined by a virtual location in the interactive gaming world.

At 1250, the method includes delivering the first spectator view via the network to the HMD of the first remote user for display. The first spectator view presents a virtual reality view of the interactive gaming world to the first remote user through the HMD. As such, the remote user is able to switch between an augmented reality view of the real-world venue (showcasing the live event) and a virtual reality view into the multi-player gaming session within the HMD. In one embodiment, the delivery of the live view is halted or paused before delivering the first spectator view to the HMD.

In another embodiment, a request is received at the server and originating from the first remote user (e.g., device of the user) to jump-out of the first spectator view. In that manner, delivery of the first spectator view is paused and/or terminated, and delivery of the live view is resumed. That is, the delivery of the 3D live view over the network from the server to the HMD of the first remote user is resumed.

In one embodiment, a plurality of spectator views into the interactive gaming world is generated. The spectator views look into the gaming world, and are each taken from a corresponding POV in the interactive gaming world. The plurality of spectator views includes the first spectator view generated from the first virtual POV. Further, the method includes generating an interface including a plurality of preview windows presenting the plurality of spectator views. When a preview window is interacted with (e.g., scrolled over), the images in the first spectator view may become animated, or enlarged, and the audio may be activated for listening by the remote user. At this point, the preview window may not have been selected for additional viewing, as described below.

Furthermore, the interface is delivered via the network to the HMD of the first remote user for display. In one embodiment, the interface is inserted into the 3D live view, such as overlaid a portion of the live view. In addition, audio may be provided in association with the spectator views. As such, the first remote user may select the spectator view of a particular preview window, in which case, the main window may now display the selected spectator view. For example, a selection of a first preview window by the first remote user is received at the server. The first preview window corresponds to the first spectator view. Upon the selection and receipt of the selection by the server, the first spectator view is delivered to the HMD of the first remote user, and audio may be activated for listening by the remote user. In particular, delivery of the interface is paused and/or terminated, and the delivery of the first spectator view from the server to the HMD of the first remote user is initiated. As such, the first spectator view is the displayed as main content—instead of the live view of the real-world venue.

In one embodiment, the interface includes a main window that is configured to display one of the spectator views of the preview windows, wherein the main window is larger than a preview window. As previously described, a corresponding preview window displays a preview of the spectator view that is available for viewing within the gaming world, and may include static or updated images along with audio. In that manner, the remote user is able to preview one or more spectator views. Further, the interface is delivered to a system of the remote user for interaction by the remote user. For example, the remote user may select the spectator view of a particular preview window, in which case, the main window may now display the selected spectator view. In particular, the method includes receiving selection of a first preview window in the interface, the first preview window being associated with the spectator view or a selected spectator view. The method includes presenting the selected spectator view in the main window of the interface, in one implementation. In another implementation, the selected spectator view may be expanded to be the main content for display within the HMD of the first remote user, as previously described.

In one embodiment, the first spectator view is generated from a first virtual POV in the gaming world by the gaming server. For example, as previously described the first spectator view may be a POV associated with a character controlled by a corresponding user (e.g., professional gamer in the eSports event). The first spectator view may also be taken from a predesigned POV. In addition, the first spectator view may focus on one of the many game plays occurring within the gaming world, each game play associated with a particular player (e.g., professional gamer playing in the multi-player gaming session). In that manner, the first spectator view into the gaming world is up close and personal to the first remote user viewing through an HMD, and not limited through a faraway view of the action in the gaming world. That is, the closer the view to the action the better for the first remote user who is virtually viewing the gaming world. In still another embodiment, the first spectator view may be a live view of a real-world venue showcasing the multi-player gaming session (e.g., eSports event).

As previously described, the first spectator view includes objects that are scaled appropriately for a point-of-view consistent with the viewer. For instance, the objects are scaled to be consistent from a POV corresponding to a human spectator in the gaming world, as represented through a corresponding spectator avatar. In that manner, the experience of the gaming world is consistent as if the remote user were actually physically located within the gaming world. This is especially beneficial when the gaming world provides a real world experience, such as when touring a museum, or vacation spot in the world. For example, the method may include an interactive gaming world including a first avatar representing the first remote user and a second avatar representing a second remote user. The second remote avatar is spectating in the gaming world, and may be in proximity to the first avatar. For example, the second remote user receives a second spectator view into the interactive gaming world, wherein the first remote user receives the first spectator view into the gaming world (e.g., at the first virtual POV). When it is determined that the two avatars are in close proximity, the first remote user and the second remote user are paired, such that a communication channel is established between the two users over which the exchange of communication is enabled between the two users.

In one embodiment, the method includes generating audio for the spectator view that is localized for the first virtual POV. In general, the gaming world includes audio from the one or more game plays. As an illustration, the game world may be described as a large sword battle being conducted on a battle field, where contestants are battling each other in close hand-to-hand combat. Sounds are being generated from all over the battlefield. As such, the audio being collected or experienced at a particular location within the gaming world would sound different than the audio being experienced at another location. For example, a first location that is close to the combat between two characters would sound different than a location that is remote from all the hand to hand combat being conducted in the battlefield (e.g., vantage of a commanding officer). As such, the audio being generated for the spectator view is localized for the first virtual POV (i.e., based on the location of the first virtual POV within the gaming world). That is, far away sounds would be diminished, and nearer sounds within the gaming world would be amplified for the first virtual POV. Further, the first spectator view is aligned with the audio that is localized. In that manner, the first remote user viewing the first spectator view can virtually participate in the gaming world.

Embodiments of the present invention are applicable to online or network gaming implementations, either in single-player (e.g., player playing a gaming application) or multi-player modes (multiple players are playing a gaming application together within a gaming session). The online or network gaming implementations may not necessarily be associated with a live event. For example, cloud gaming provider 112 may maintain and execute a gaming application being played by a gamer. In addition, cloud gaming provider 112 may establish and manage a multi-player gaming session of a gaming application in support of one or more gamers. In single-player or multi-player modes, the cloud gaming provider processes gamer inputs from one or more gamers to affect the game state(s) of the executing gaming application. Further, the game system 1400 may be configured to implement online or network gaming supporting single player or multi-player modes and/or gaming sessions.

Moreover, a gamer can have the option to participate and receive a view of his or her actions, both from a player standpoint, as well as from one or more jump-in or spectator views. This option is implementable within the single player and/or multi-player modes. That is, the gamer is able to view his or her actions from multiple viewpoints within the interactive gaming world. In addition, the gamer is able to view additional spectator views that may not necessarily include the actions of the gamer, as previously described. That is, the gamer may select a view of the actions of another gamer through a spectator view, or may choose to view any part of the interactive gaming world. As an example, a multi-player gaming session may be established for a soccer match, wherein two teams with eleven players a side have signed up for playing an online soccer game (e.g., in a tournament mode). One gamer initially starts as a goal-keeper for one of the teams. For that gamer, as the game is being played, there may not be constant action, unless the ball is directed towards his or her goal. The gamer would be intensely occupied in a penalty-kick situation, wherein the gamer is at the center of the action, and is focused on stopping the ball on the whistle. At that moment, the gamer will receive a primary view inside a respective HMD to simulate the experience that an actual goal-keeper would have. Being fully immersive, the gamer will react to stopping the ball as soon as the penalty is attempted. In that manner, the gamer will have a very immersive and close to real-life experience to play a network game with a player's view. On the other hand, the gamer as goal-keeper may not be intensely involved in the action at all times, as the goal-keeper is not running around the field at all times, and is confined mainly within the 18 yard box surrounding the goal. This is also consistent with the immersive and close to real-life experience of the goal-keeper. However, embodiments of the present invention can be configured to provide one or more views for the gamer who is playing goal-keeper, such as one or more spectator views into the interactive gaming world (the soccer pitch) beyond just what the goal-keeper would view. In addition, the gamer playing goal-keeper may be allowed to switch with another gamer. That is, embodiments of the present invention provide additional flexibility for gamers to switch roles, such as the gamer playing goal-keeper to switch with another gamer and become a center forward (e.g., on the same team or opposite teams). In that manner, this would provide more excitement for the players who are playing the multi-player gaming session.

Figure 13:
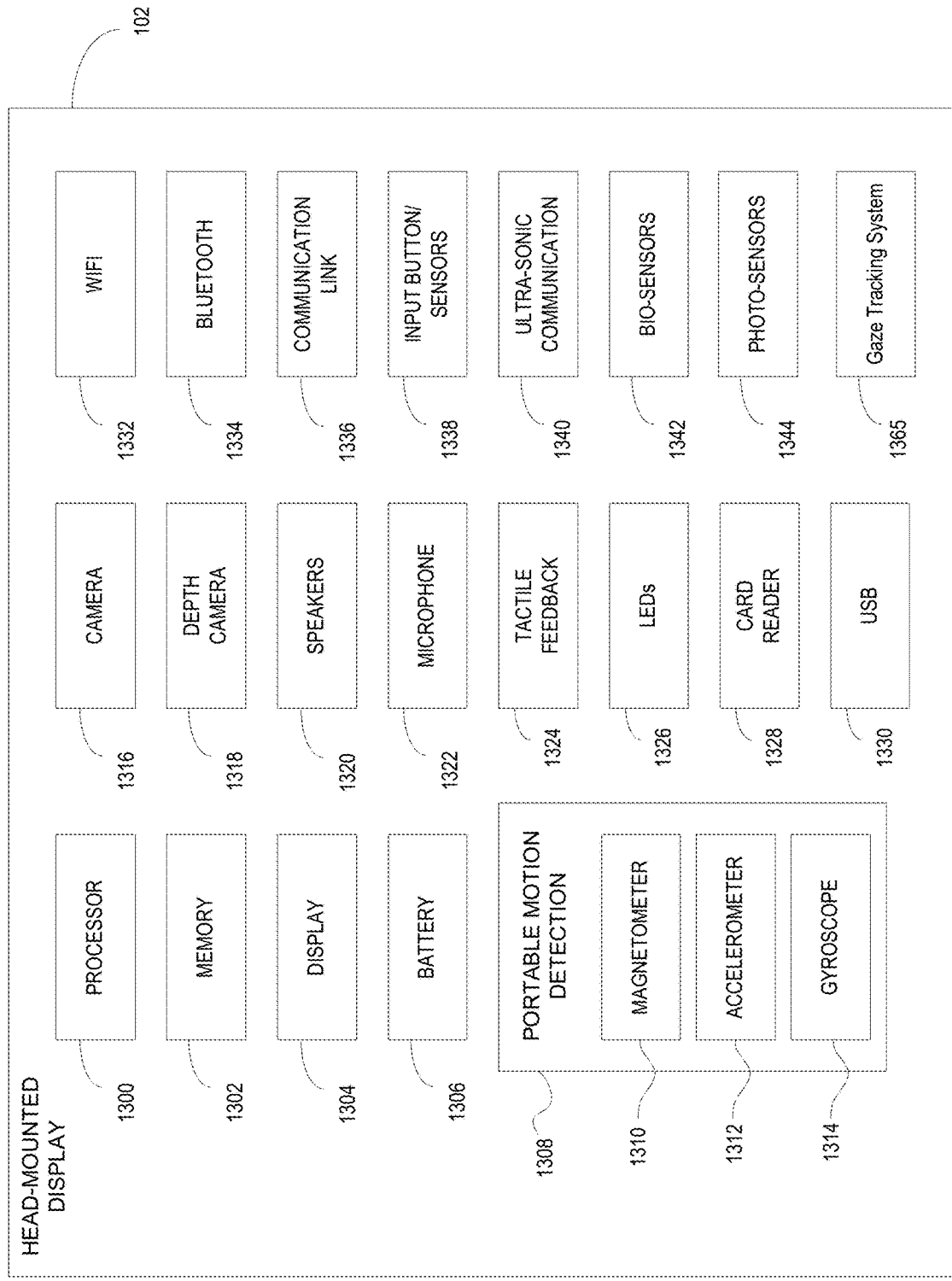
FIG. 13 is a diagram illustrating components of a head-mounted display, in accordance with an embodiment of the disclosure.

FIG. 13, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

Photo-sensors 1344 are included to respond to signals from emitters (e.g., infrared base stations) placed in a 3-dimensional physical environment. The gaming console analyzes the information from the photo-sensors 1344 and emitters to determine position and orientation information related to the head-mounted display 102.

In addition, gaze tracking system 1365 is included and configured to enable tracking of the gaze of the user. For example, system 1365 may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 14:
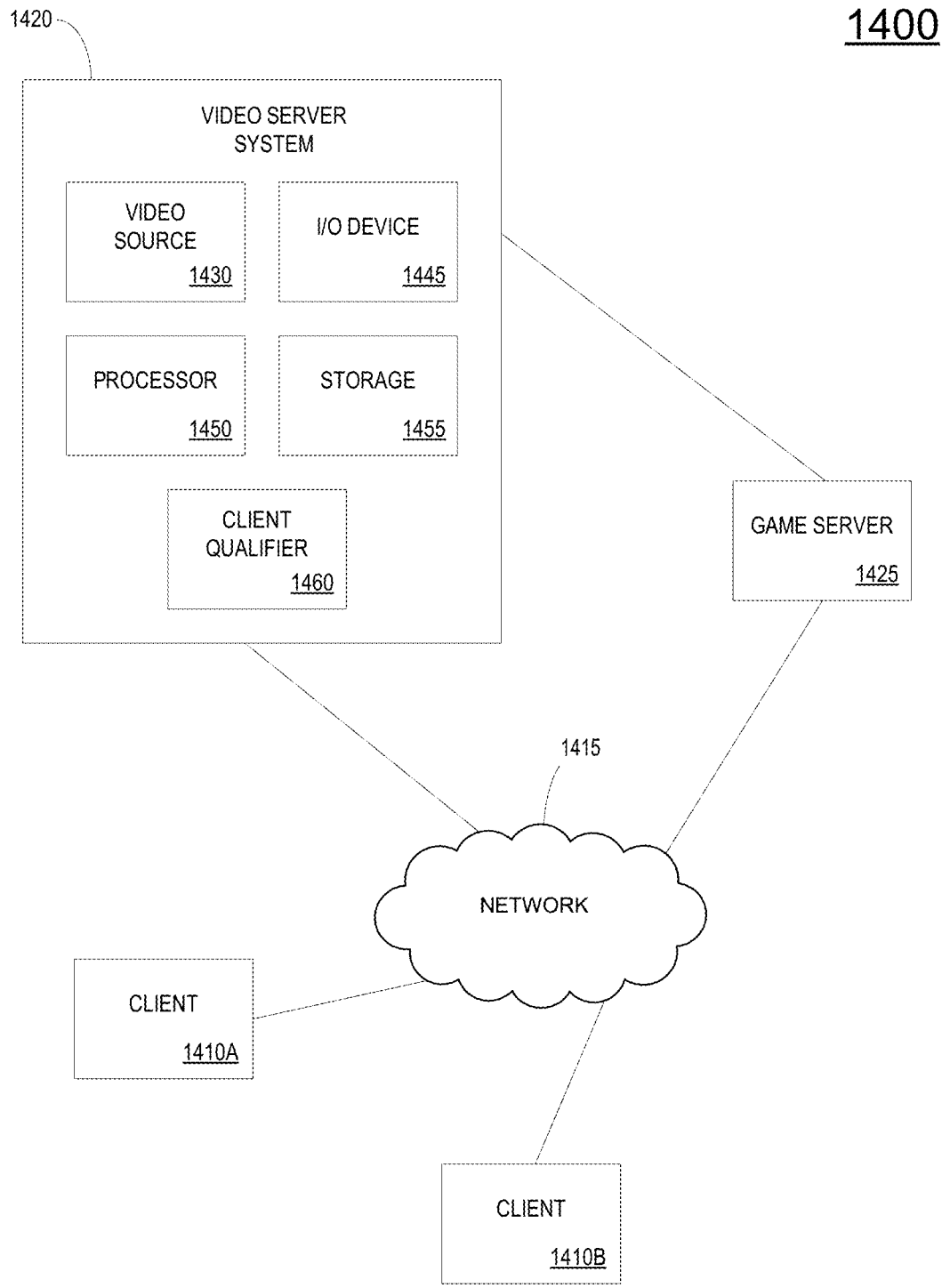
FIG. 14 is a block diagram of a Game System, according to various embodiments of the disclosure.

FIG. 14 is a block diagram of a Game System 1400, according to various embodiments of the disclosure. Game System 1400 is configured to provide a video stream to one or more Clients 1410 via a Network 1415, such as in a single-player mode or multi-player mode. Game system 1400 is analogous to cloud gaming provider 112, in embodiments. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 1410, referred to herein individually as 1410A., 1410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect gameplay. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g., a hard drive, an optical drive, or solid state storage. Storage 1455 is configured (e.g., by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc., of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

While specific embodiments have been provided for providing spectator views into a gaming world associated with one or more game plays as generated through execution of a multi-player gaming application as controlled by one or more users, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method comprising:
generating at a server a three-dimensional (3D) view of an event based on one or more captured video streams, the event being held in a real-world venue, the 3D view generated for a physical point-of-view (POV) of the event as selected by a first remote user being located outside of the real-world venue at a first remote location, wherein the physical POV is taken from a first anchor point in the real-world venue, wherein the first anchor point is a first seat in the real-world venue;
generating an augmented reality view of the event by augmenting the 3D view with a virtual representation of a second remote user remotely viewing the event, the virtual representation of the second remote user being located at a second anchor point in the real-world venue, the second remote user being located outside of the real-world venue at a second remote location, wherein the second anchor point is a second seat in the real-world venue;
streaming the augmented reality view of the event via a network from the server to a head mounted display (HMD) of the first remote user, the first remote user being able to view the virtual representation of the second remote user when the first remote user turns towards the second anchor point where the virtual representation of the second remote user is located in the augmented reality view of the event;
detecting that a virtual representation of the first remote user in the first seat turns towards the virtual representation of the second remote user in the second seat in the augmented reality view of the event; and
automatically establishing a communication channel to enable initiation of a communication between the first remote user and the second remote user based on the detecting that the virtual representation of the first remote user turns towards the virtual representation of the second remote user within the augmented reality view of the event.

2. The method of claim 1, further comprising:
detecting that the second remote user turns towards the first anchor point where the virtual representation of the first remote user is located in an augmented reality view of the event generated for the second user; and
persisting the communication channel to enable continued communication between the first and second remote users.

3. The method of claim 2, wherein the first remote user is viewing the second remote user and the second remote user is viewing the first remote user in respective augmented reality views of the event generated for the first remote user and the second remote user.

4. The method of claim 1, wherein the event is a live event or a recording of the live event.

5. The method of claim 1, wherein the event is a live or recorded gaming session of a video game.

6. The method of claim 1, wherein the second remote user is a friend of the first remote user in a social network.

7. The method of claim 1,
wherein the 3D view includes a participant of the event, the participant being located at a third anchor point in the real-world venue,
wherein the augmented reality view of the event shows both the virtual representation of the second remote user and the participant.

8. The method of claim 1, further comprising:
scaling a size of the virtual representation of the second remote user in the augmented reality view to visually align with a size of an object presented within the augmented reality view.

9. A non-transitory computer-readable medium storing a computer program for implementing a method, the non-transitory computer-readable medium comprising:
program instructions for generating at a server a three-dimensional (3D) view of an event based on one or more captured video streams, the event being held in a real-world venue, the 3D view generated for a physical point-of-view (POV) of the event as selected by a first remote user being located outside of the real-world venue at a first remote location, wherein the physical POV is taken from a first anchor point in the real-world venue, wherein the first anchor point is a first seat in the real-world venue;
program instructions for generating an augmented reality view of the event by augmenting the 3D view with a virtual representation of a second remote user remotely viewing the event, the virtual representation of the second remote user being located at a second anchor point in the real-world venue, the second remote user being located outside of the real-world venue at a second remote location, wherein the second anchor point is a second seat in the real-world venue;
program instructions for streaming the augmented reality view of the event via a network from the server to a head mounted display (HMD) of the first remote user, the first remote user being able to view the virtual representation of the second remote user when the first remote user turns towards the second anchor point where the virtual representation of the second remote user is located in the augmented reality view of the event;
detecting that a virtual representation of the first remote user in the first seat turns towards the virtual representation of the second remote user in the second seat in the augmented reality view of the event; and
automatically establishing a communication channel to enable initiation of a communication between the first remote user and the second remote user based on the detecting that the first remote user turns towards the virtual representation of the second remote user in the second seat within the augmented reality view of the event.

10. The non-transitory computer-readable medium of claim 9, further comprising:
program instructions for detecting that the second remote user turns towards the first anchor point where the virtual representation of the first remote user is located in an augmented reality view of the event generated for the second user; and program instructions for persisting the communication channel to enable continued communication between the first and second remote users, wherein the first remote user is viewing the second remote user and the second remote user is viewing the first remote user in respective augmented reality views of the event generated for the first remote user and the second remote user.

11. The non-transitory computer-readable medium of claim 9, wherein in the program instructions the event is a live event or a recording of the live event.

12. The non-transitory computer-readable medium of claim 9, wherein in the program instructions the event is a live or recorded gaming session of a video game.

13. The non-transitory computer-readable medium of claim 9, further comprising:
program instructions for scaling a size of the virtual representation of the second remote user in the augmented reality view to visually align with a size of an object presented within the augmented reality view.

14. A computer system comprising:
a processor;
memory coupled to the processor and having stored therein instructions that, if executed by the computer system, cause the computer system to execute a method for implementing a graphics pipeline, comprising:
generating at a server a three-dimensional (3D) view of an event based on one or more captured video streams, the event being held in a real-world venue, the 3D view generated for a physical point-of-view (POV) of the event as selected by a first remote user being located outside of the real-world venue at a first remote location, wherein the physical POV is taken from a first anchor point in the real-world venue, wherein the first anchor point is a first seat in the real-world venue;
generating an augmented reality view of the event by augmenting the 3D view with a virtual representation of a second remote user remotely viewing the event, the virtual representation of the second remote user being located at a second anchor point in the real-world venue, the second remote user being located outside of the real-world venue at a second remote location, wherein the second anchor point is a second seat in the real-world venue;
streaming the augmented reality view of the event via a network from the server to a head mounted display (HMD) of the first remote user, the first remote user being able to view the virtual representation of the second remote user when the first remote user turns towards the second anchor point where the virtual representation of the second remote user is located in the augmented reality view of the event;
detecting that a virtual representation of the first remote user in the first seat turns towards the virtual representation of the second remote user in the second seat in the augmented reality view of the event; and
automatically establishing a communication channel to enable initiation of a communication between the first remote user and the second remote user based on the detecting that the first remote user turns towards the virtual representation of the second remote user in the second seat within the augmented reality view of the event.

15. The computer system of claim 14, the method further comprising:
detecting that the second remote user turns towards the first anchor point where the virtual representation of the first remote user is located in an augmented reality view of the event generated for the second user; and
persisting the communication channel to enable continued communication between the first and second remote users,
wherein the first remote user is viewing the second remote user and the second remote user is viewing the first remote user in respective augmented reality views of the event generated for the first remote user and the second remote user.

16. The computer system of claim 14, wherein in the method the event is a live event or a recording of the live event.

17. The computer system of claim 14, wherein in the method the event is a live or recorded gaming session of a video game.

18. The computer system of claim 14, the method further comprising:
scaling a size of the virtual representation of the second remote user in the augmented reality view to visually align with a size of an object presented within the augmented reality view.

* * * * *